(12) United States Patent
Lee et al.

(10) Patent No.: US 8,175,157 B2
(45) Date of Patent: May 8, 2012

(54) APPARATUS AND METHOD FOR CONTROLLING DATA WRITE/READ IN IMAGE PROCESSING SYSTEM

(75) Inventors: Sangjo Lee, Suwon-si (KR); Daesung Cho, Seoul (KR); Doohyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1557 days.

(21) Appl. No.: 11/354,174

(22) Filed: Feb. 15, 2006

(65) Prior Publication Data

US 2006/0182181 A1 Aug. 17, 2006

(30) Foreign Application Priority Data

Feb. 15, 2005 (KR) .................. 10-2005-0012420

(51) Int. Cl.
  *H04N 7/12* (2006.01)
  *H04N 9/77* (2006.01)
  *G06K 9/46* (2006.01)
(52) U.S. Cl. .............. 375/240.13; 375/240.12; 382/238; 348/663
(58) Field of Classification Search ............. 375/240.03, 375/240.12, 240.13, 240.14, 240.16, 240.2–240.24, 375/245, 246, 253; 382/236, 238, 239, 248, 382/251, 253; 348/27, 663, 665, 667–670
See application file for complete search history.

(56) References Cited

U.S. PATENT DOCUMENTS

| | | | | |
|---|---|---|---|---|
| 4,743,970 A | * | 5/1988 | Barnett et al. | ............... 348/717 |
| 5,608,888 A | | 3/1997 | Purcell et al. | |
| 5,754,234 A | * | 5/1998 | Kitsuki et al. | ............... 348/394.1 |
| 5,805,483 A | * | 9/1998 | Shim | ............... 708/402 |
| 5,924,111 A | * | 7/1999 | Huang et al. | ............... 711/5 |
| 6,075,899 A | * | 6/2000 | Yoshioka et al. | ............... 382/233 |
| 6,812,865 B2 | * | 11/2004 | Saunders | ............... 341/51 |
| 7,471,298 B1 | * | 12/2008 | Noonburg | ............... 345/531 |
| 2006/0182181 A1 | * | 8/2006 | Lee et al. | ............... 375/240.24 |

OTHER PUBLICATIONS

"Text of ISO/IEC FDIS 14496-10: Information Technology—Coding of Audio-Visual Objects", ISO/IEC JTC 1/SC 29/WG 11, n5555, Mar. 2003, pp. I-xi and 1-257.
Korean Office Action dated Jun. 30, 2006 issued with respect to Korean Application No. 10-2005-0012420, which corresponds to the above-referenced application.

* cited by examiner

*Primary Examiner* — Young T. Tse
(74) *Attorney, Agent, or Firm* — Staas & Halsey LLP

(57) ABSTRACT

An apparatus and method for writing and/or reading data in an image processing system are provided. The apparatus for writing data includes: a memory formed with at least one or more banks capable of being accessed independently; and a memory control unit controlling so that a luminance component, a first chrominance component and a second chrominance component belonging to one macroblock are written based on respective structures different to each other, in the memory. The apparatus for reading data includes: a memory formed with one or more banks capable of being accessed independently in which a luminance component, a first chrominance component, and a second chrominance component belonging to one macroblock are written based on respective structures different to each other, in each bank of the memory; and a memory control unit controlling so that a luminance component, a first chrominance component, and a second chrominance component required are read from the memory.

40 Claims, 19 Drawing Sheets

▨ TOP FIELD PIXEL
☐ BOTTOM FIELD PIXEL
⌂ DUMMY PIXEL

▨ TOP FIELD PIXEL
☐ BOTTOM FIELD PIXEL
⸋ DUMMY PIXEL

☒ FRAME (FIELD) PIXEL
☐ DUMMY PIXEL

☒ FRAME (FIELD) PIXEL
☐ DUMMY PIXEL

▨ TOP FIELD PIXEL
☐ BOTTOM FIELD PIXEL
⁅⁆ DUMMY PIXEL

▨ TOP FIELD PIXEL
☐ BOTTOM FIELD PIXEL
⊡ DUMMY PIXEL

■ FRAME (FIELD) PIXEL
☐ DUMMY PIXEL

■ FRAME (FIELD) PIXEL
☐ DUMMY PIXEL

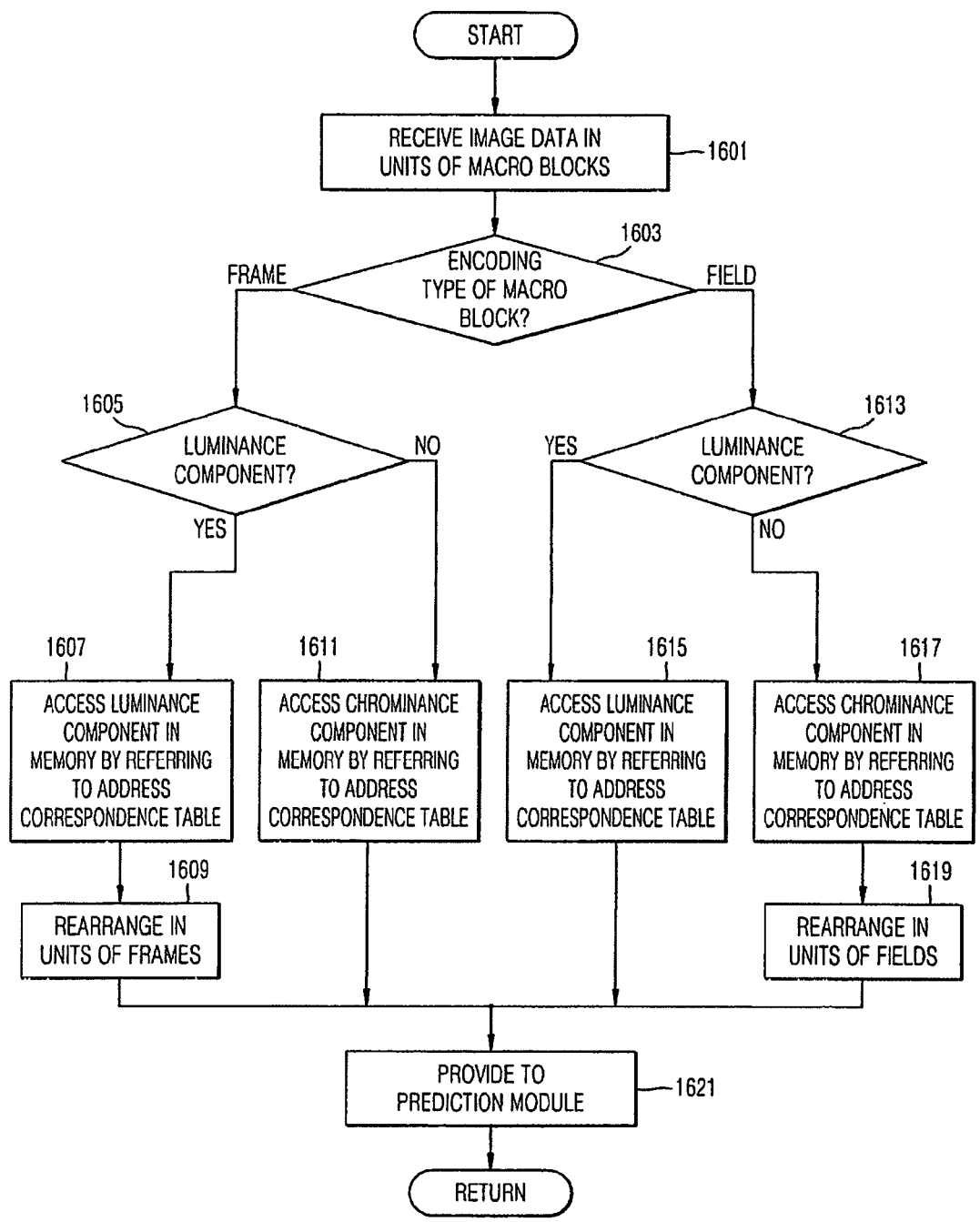

APPARATUS AND METHOD FOR CONTROLLING DATA WRITE/READ IN IMAGE PROCESSING SYSTEM

CROSS-REFERENCE TO RELATED APPLICATIONS

This application claims the benefit of Korean Patent Application No. 10-2005-0012420, filed on Feb. 15, 2005, in the Korean Intellectual Property Office, the disclosure of which is incorporated herein in its entirety by reference.

BACKGROUND OF THE INVENTION

1. Field of the Invention

The present invention relates to an image processing system, and more particularly, to an apparatus and method for controlling data writing and/or reading by mapping luminance components and chrominance components into different structures so that the number of required cycles and the amount of data to be fetched can be reduced when data is accessed in a memory in a burst mode.

2. Description of the Related Art

Among image processing systems, H.264 or MPEG-4 advanced video coding (AVC) decoder is a standard technology formulated in a joint video team (JVT) that is a cooperative project of international standard organizations, ISO/IEC MPEG and ITU-T VCEG (Refer to "Text of ISO/IEC FDIS 14496-10: Information Technology—Coding of audio-visual objects—Part 10: Advanced Video Coding", ISO/IEC JTC 1/SC 29/WG 11, n5555, March 2003). This was developed with an aim of improving encoding efficiency more than double those of MPEG-1, MPEG-2, MPEG-4 Part 2 encoding standards of the existing ISO/IEC organization and H.261, H.262 (MPEG-2), and H.263 of the ITU organization. In order to improve encoding efficiency, improved technologies different from conventional video compression methods were provided here. Among the technologies, as representative ones, there are an inter prediction technology using multiple reference frames and a variable block size, and a context adaptive binary arithmetic coding (CABAC) technology, a 4×4 integer transform, or a deblocking filter.

However, since these technologies for improving encoding efficiency increase greatly the complexity of a codec compared to the conventional methods, it is difficult for these technologies to obtain the competitiveness of a hardware chip solution for high definition (HD) image services. For example, in order to decode an HD format bitstream with 1920×1080i@60 Hz, a specification with level 4.0 or 4.1 or higher is required. Here, levels 4.0 and 4.1 relate to the limits of bitrates of an input bitstream, and an input of up to 24 Mbps in level 4.0 and 60 Mbps in level 4.1 can be processed. If a pipeline processing in units of macroblocks is enabled in a memory chip, approximately 4.084 μsec will be taken to process one macroblock. The number of cycles required for processing one macroblock varies with respect to operational frequencies to be employed.

Meanwhile, when inter prediction for one macroblock is performed in a prediction module among elements of the H.264 or MPEG-4 AVC decoder and the size of a block processed is small, a memory should be accessed many times to obtain a prediction block and also many adjacent pixels should be accessed such that the delay increases greatly.

SUMMARY OF THE INVENTION

Additional aspects and/or advantages of the invention will be set forth in part in the description which follows and, in part, will be apparent from the description, or may be learned by practice of the invention.

The present invention provides an apparatus and method for controlling data writing and/or reading by mapping luminance components and chrominance components into different structures so that the number of required cycles and the amount of data to be fetched can be reduced when data is accessed in a memory in a burst mode in an image processing system.

According to an aspect of the present invention, there is provided an apparatus for controlling data writing in an image processing system, including: a memory formed with at least one or more banks capable of being accessed independently; and a memory control unit controlling so that a luminance component, a first chrominance component and a second chrominance component belonging to one macroblock are written based on respective structures different to each other, in the memory.

According to another aspect of the present invention, there is provided a method for controlling data writing in an image processing system, including: providing a memory formed with at least one or more banks capable of being accessed independently; and controlling so that a luminance component, a first chrominance component and a second chrominance component belonging to one macroblock are written based on respective structures different to each other, in the memory.

According to still another aspect of the present invention, there is provided an apparatus for controlling data reading in an image processing system, including: a memory formed with one or more banks capable of being accessed independently in which a luminance component, a first chrominance component, and a second chrominance component belonging to one macroblock are written based on respective structures different to each other, in each bank of the memory; and controlling so that a luminance component, a first chrominance component, and a second chrominance component required are read from the memory.

According to yet still another aspect of the present invention, there is provided an apparatus for controlling data writing and reading in an image processing system, including: a memory formed with one or more banks capable of being accessed independently in which a luminance component, a first chrominance component, and a second chrominance component belonging to one macroblock are written based on respective structures different to each other, in each bank of the memory; a first memory control unit controlling so that a luminance component, a first chrominance component and a second chrominance component belonging to the macroblock are written based on respective structures different to each other, in the memory; and a second memory control unit controlling so that a luminance component, a first chrominance component, and a second chrominance component required are read from the memory.

According to a further aspect of the present invention, there is provided a method for controlling data writing and reading in an image processing system, including: providing a memory formed with one or more banks capable of being accessed independently in which a luminance component, a first chrominance component, and a second chrominance component belonging to one macroblock are written based on respective structures different to each other, in each bank of the memory; controlling so that a luminance component, a first chrominance component and a second chrominance component belonging to the macroblock are written based on respective structures different to each other, in the memory; and controlling so that a luminance component, a first chrominance component, and a second chrominance component required are read from the memory.

According to an additional aspect of the present invention, there is provided a computer readable recording medium having embodied thereon a computer program for executing the method for controlling data writing and/or reading.

BRIEF DESCRIPTION OF THE DRAWINGS

The above and other features and advantages of the present invention will become more apparent by describing in detail exemplary embodiments thereof with reference to the attached drawings in which:

FIG. 16 is a flowchart of the operations performed by a method to control data reading according to an embodiment of the present invention.

DETAILED DESCRIPTION OF THE PREFERRED EMBODIMENTS

An apparatus and method for memory mapping according to the present invention will now be described more fully with reference to the accompanying drawings, in which exemplary embodiments of the invention are shown.

Figure 1:
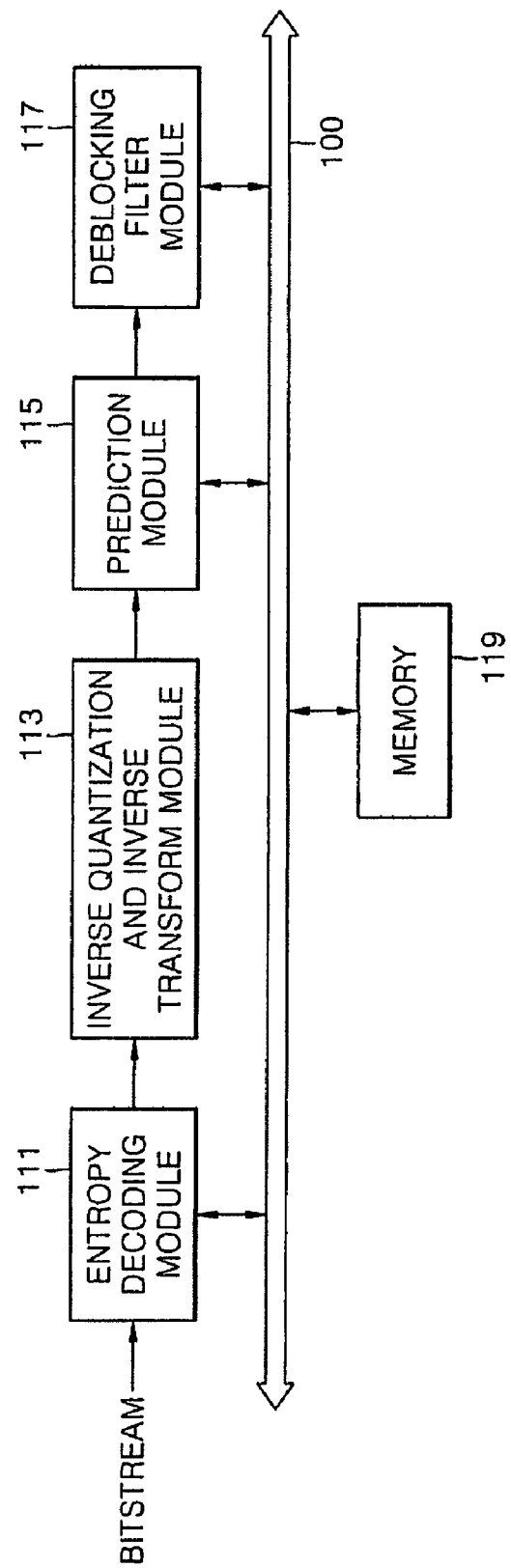
FIG. 1 is a schematic block diagram of a video decoder complying with the H.264/AVC standard to which the present invention is applied.

Referring to FIG. 1, a video decoder complying with the H.264/AVC standard to which the present invention is applied included an entropy decoding module 111, an inverse quantization and inverse transform module 113, a prediction module 115, a deblocking filter module 117, and a memory 119. Here, the memory 119 is included in the video decoder or is implemented by an external buffer of the video decoder. If the memory 119 is an external buffer, a bus 100 is a bus defined as an external bus by the H.264 codec, and if the memory 119 is included in the video decoder, the bus 100 is a bus defined as an internal bus defined by the H.264 codec.

In the video decoder shown in FIG. 1, in order to improve the entire decoding speed, the entropy decoding module 111, the inverse quantization and inverse transform module 113, the prediction module 115, and the deblocking filter module 117 are operated in units of macroblocks in a pipeline method. That is, when the entropy decoding module 111 performs entropy decoding of an n-th macroblock, the inverse quantization and inverse transform module 113 performs inverse quantization and inverse transform of the (n-1)-th macroblock, the prediction module 115 performs intra prediction or inter prediction of the (n-2)-th macroblock, and the deblocking filter module 117 performs deblocking filtering of the (n-3)-th macroblock.

The operations of each module will now be explained briefly an aspect of the present invention.

The entropy decoding module 111 performs entropy decoding of a received bitstream in units of macroblocks. Here, the bitstream is formed with a video coding layer (VCL) network abstraction layer (NAL) and a non-VCL NAL, and the VCL NAL is formed with a slice header portion and a data portion. The data portion is formed with a plurality of macroblocks.

The inverse quantization and inverse transform module 113 performs inverse quantization of entropy decoded data and inverse transforms the result of the inverse quantization. The inverse transformed result obtained in the inverse quantization and inverse transform module 113 is residual information, which is provided to the prediction module 115 and, concurrently, stored in the memory 119 through the bus 100.

The prediction module 115 receives residual information of a current macroblock, predicts motions among pictures, and by using the predicted motions of pictures and residual information, restores the original image of the current macroblock. The restored result is provided to the deblocking filter module 117 and, concurrently, stored in the memory 119 through the bus 100.

The deblocking filter module 117 performs deblocking filtering of the restored image of the current macroblock provided by the prediction module 117 to remove the blocking effect between blocks, and the result of the deblocking filtering is output to the backend and stored in the memory 119 through the bus 100.

In the relations between respective modules and the memory 119, the entropy decoding module 111, the prediction module 115, and the deblocking filter module 117 that are operated in the pipeline method access the memory by using the bus 100, while the inverse quantization and inverse transform module 113 does not access the memory 119 and has only interfaces with the entropy decoding module 111 and the prediction module 115.

In particular, when performing intra prediction or inter predication, the prediction module 115 obtains adjacent macroblock data from the memory 119 through the bus 100, requires a large number of cycles and a lot of data amount to perform the prediction in real time. In particular, in case of the H.264 codec, the amount of data that is required to be accessed is much more than that of the conventional video standards. This will now be explained in more detail.

The prediction process performed in the prediction module 115 includes intra prediction and inter prediction according to the type of macroblocks.

In the intra prediction, adjacent pixels are referred to. Since processing of one macroblock requires 21 pixels in width and 16 pixels in length, only 37 pixels are fetched from the memory 119 such that the amount of computation is relatively small. However, in case of the inter prediction, the amount of data to be processed through an external memory is large and interpolation process with a ¼ pixel accuracy is performed. Accordingly, the complexity is high. In case of the inter prediction, when the prediction module 115 performs motion prediction in units of 4×4 blocks, the data access amount becomes more than that of other codecs using 16×16 block units or 8×8 block units. Accordingly, in case of the inter prediction, when data is read from the memory 119, a burst mode is used. The burst mode is a method to improve the usage efficiency of a bus by reading a large amount of data at once from the memory 119 through direct memory access (DMA). In case of a 64-bit (8-byte) data bus, if a memory control unit (503 of FIG. 5) receives an address of the memory 119 storing requested data, the data corresponding to the address is accessed. After that, since the succeeding data is stored in the succeeding locations, the succeeding data is continuously accessed by using addresses increased by 64 bits each time. Thus, generally, if the burst mode is used to read data from the memory through the DMA, much data is read at one time such that more data is read in a given number of cycles and the efficiency improves.

Figure 2:
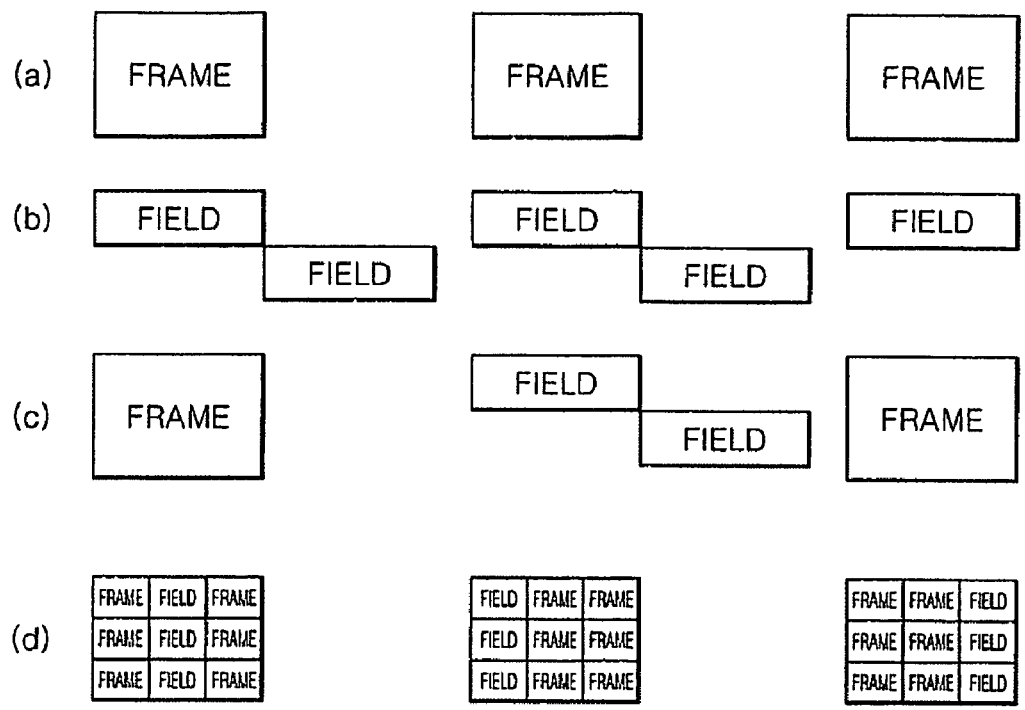
FIG. 2 illustrates the structure of a macroblock used in a prediction module shown in FIG. 1.

FIG. 2 illustrates the structure of a macroblock used in the prediction module 115 shown in FIG. 1. All macroblocks belonging to each frame have a frame structure or a field structure as shown in (a) and (b) of FIG. 2, or a frame structure and a field structure appears alternately as shown in (c) of FIG. 2. Also, when macroblocks are coded in a macroblock adaptive frame field (MBAFF) mode, macroblocks of different types are adjacent to each other in one frame as shown in (d) of FIG. 2. In the MBAFF mode, a pair of macroblocks adjacent in the vertical direction are coded together and the macroblocks included in each pair are of an identical type. That is, the macroblocks included in each pair have either all frame structure or all field structures. Generally, one field is formed with a top field and a bottom field. The top field means an even field formed with an even number of scanning lines and the bottom field means an odd field formed with an odd number of scanning lines.

Figure 3:
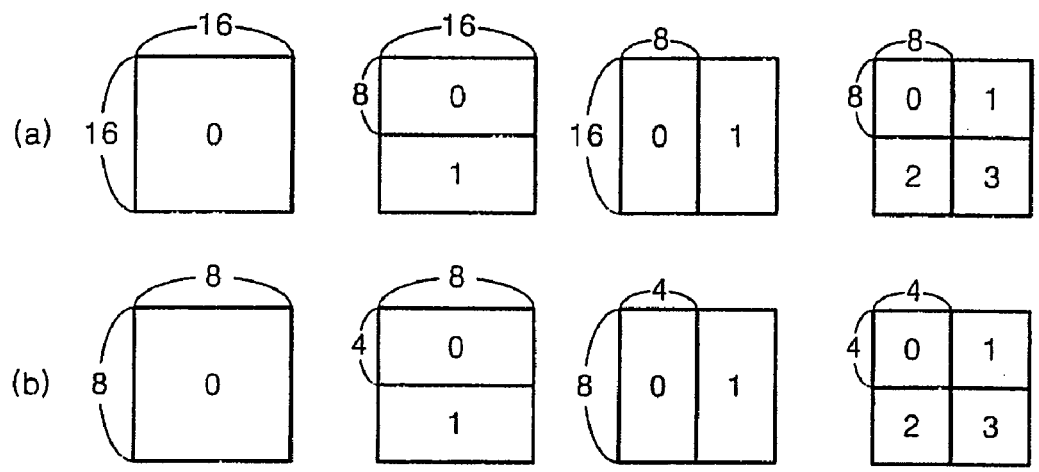
FIG. 3 illustrates an example of a method for dividing an image into blocks of a predetermined size for temporal prediction of an image in the prediction module shown in FIG. 1.

FIG. 3 illustrates an example of a method to divide an image into blocks of a predetermined size for temporal prediction of the image in the prediction module 115 shown in FIG. 1. This method is used by ISO/IEC 14496-10 and ITU-T Rec. H.264 standard technologies. Basically, as shown in (a) of FIG. 3, one macroblock is divided into blocks of a variety of sizes including a 16×16 block, a 16×8 block, an 8×16 block, and an 8×8 block, and the motion vector of each block is obtained and an image value is predicted temporally. In particular, the 8×8 block is again divided into blocks with sizes of 8×8, 8×4, 4×8, and 4×4, so that even a fine motion can be sensed. Also, when the temporal prediction is used, in order to use a half-pel or quarter-pel motion prediction method, a previous alpha channel image is magnified double or four times and then motion prediction can be performed. For this image magnification, bi-linear interpolation is performed in the MPEG-4 and interpolation using a 6 tap filter is performed in the H.264.

Figure 4A:
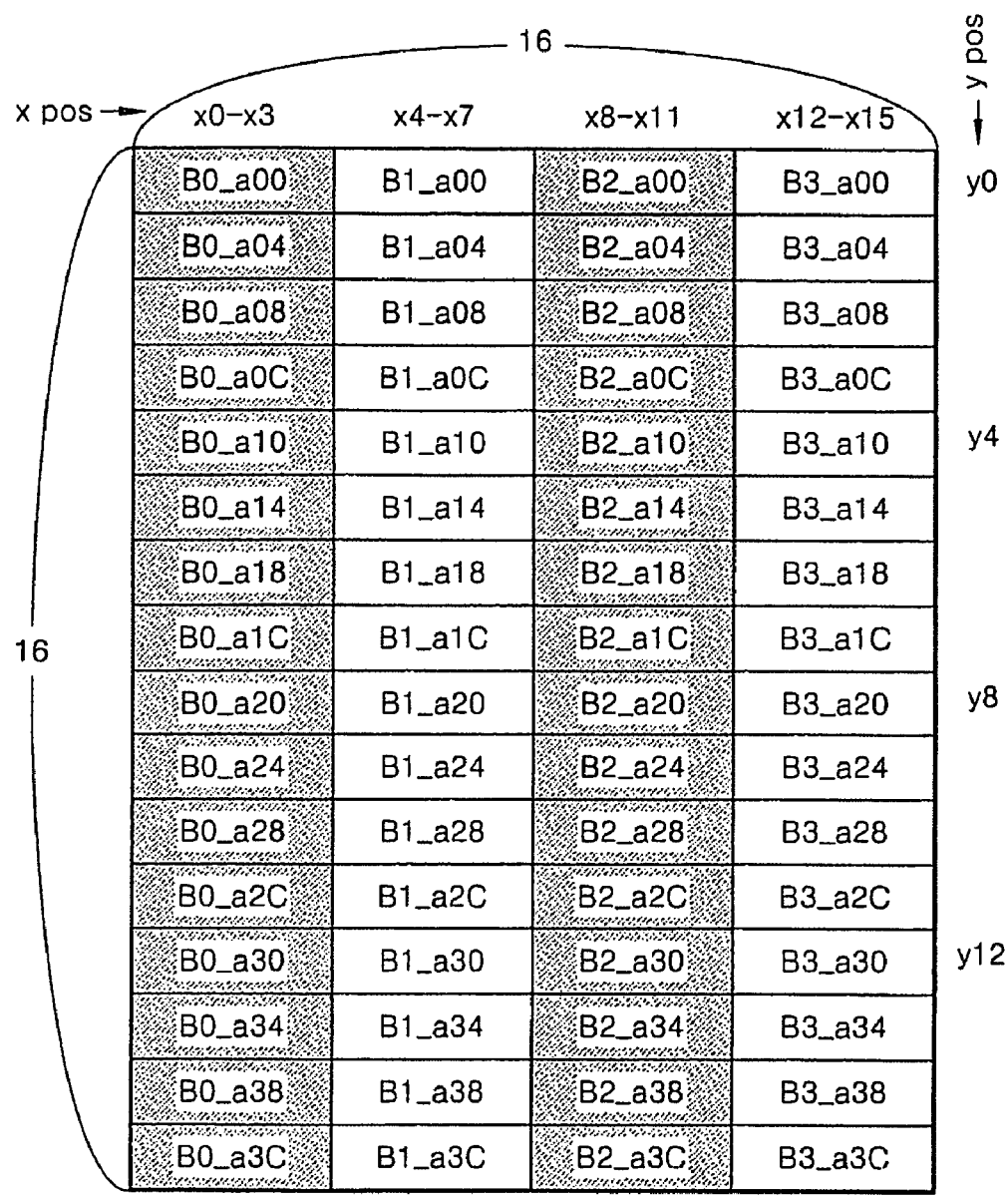
FIGS. 4A and 4B illustrates a method for storing a restored image provided from the prediction module or a deblocking filter module shown in FIG. 1 in a memory according to an embodiment of the present invention.
Figure 4B:
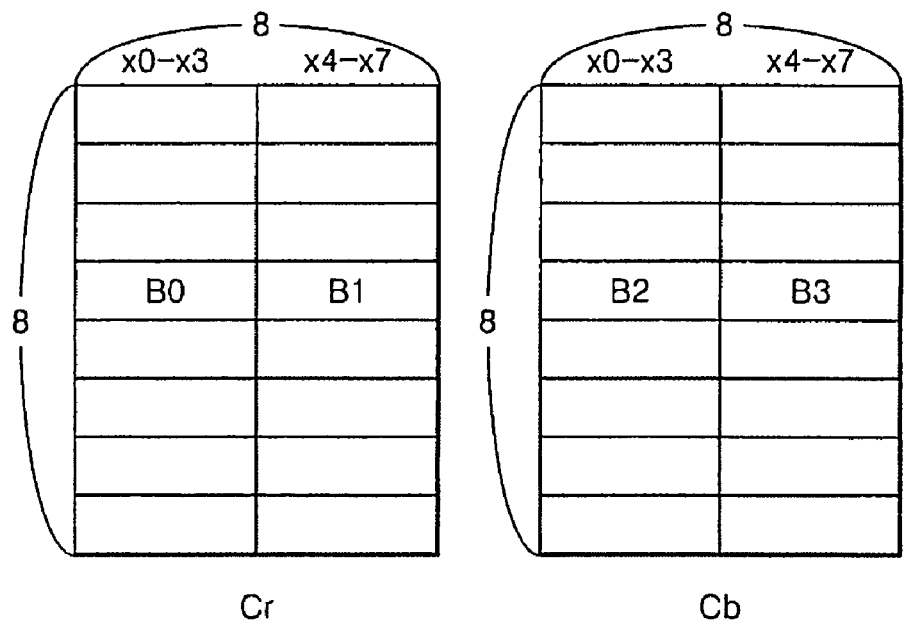

FIGS. 4A and 4B illustrate a method to store a restored image provided from the prediction module 115 or the deblocking filter module 117 shown in FIG. 1 in the memory 119.

FIG. 4A shows a method to store a luminance component (Y) and FIG. 4B shows a method to store chrominance components (Cr, Cb). At this time, the memory 119 is formed with 4 banks. The luminance component included in one macroblock is stored such that the addresses increase in the vertical direction in the memory 119 and banks change in each 4 bytes in the horizontal direction as shown in FIG. 4A. Chrominance components Cr and Cb included in one macroblock are stored such that each components occupies two banks, the addresses increase in the vertical direction in the memory 119, and banks change in each 4 bytes in the horizontal direction as shown in FIG. 4B.

Figure 5:
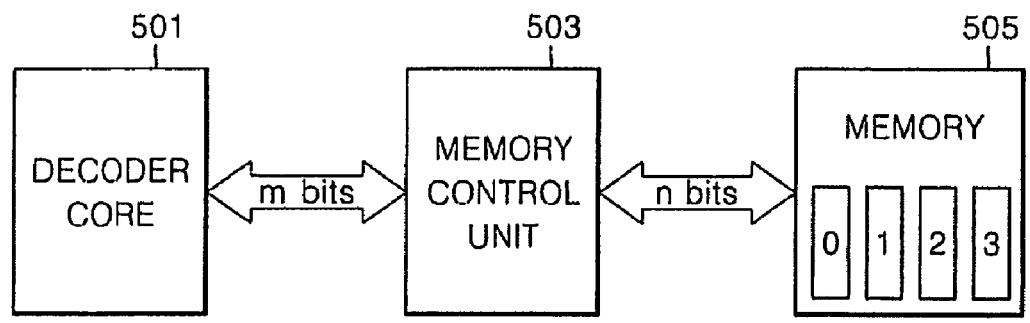
FIG. 5 is a schematic block diagram of the structure of an apparatus to control data writing and/or reading according to an embodiment of the present invention.

FIG. 5 is a schematic block diagram of the structure of an apparatus to control data writing and reading according to an aspect of the present invention, which includes a decoder core 501, a memory control unit 503, and a memory 505.

Referring to FIG. 5, the memory 505 is formed with 4 banks, each of which has an address access structure independent to each other. The decoder core 501 and the memory control unit 503 are connected through an m-bit bus, and the memory control unit 503 and the memory 505 are connected through an n-bit bus. When an SDRAM is used as the memory 505, m and n have an identical value, and when a double data rate (DDR) SDRAM is used as the memory 505, m is twice bigger than n. This is because the DDR SDRAM can access data twice in one clock cycle.

Figure 6A:
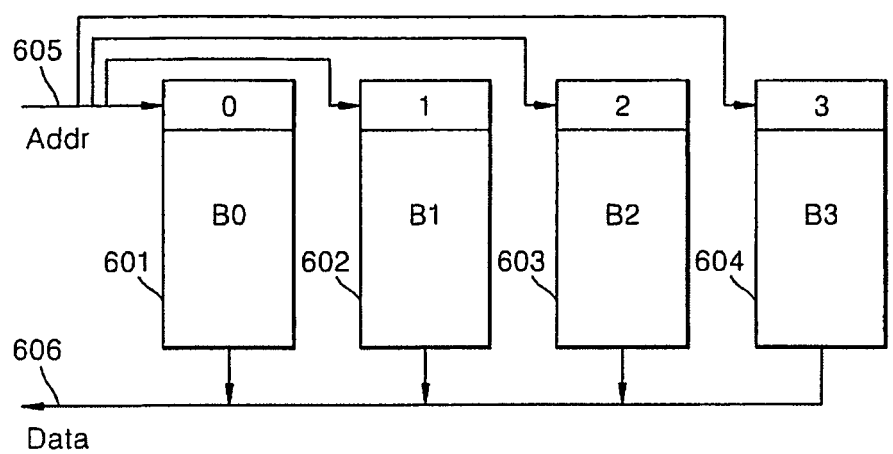
FIGS. 6A through 6C are diagrams explaining detailed structures and operations of a memory shown in FIG. 5.
Figure 6B:
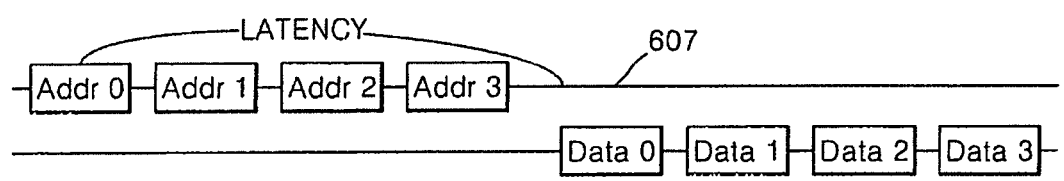
Figure 6C:
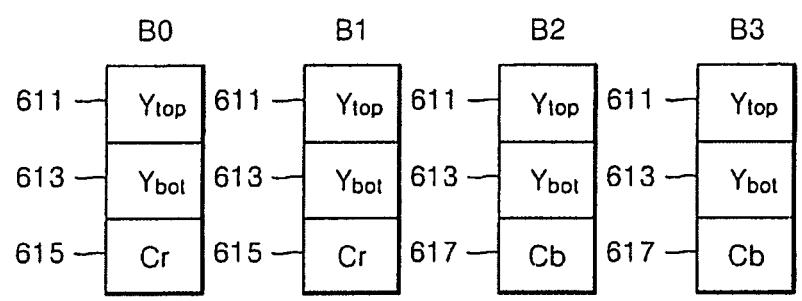

FIGS. 6A through 6C are diagrams explaining detailed structures and operations of the memory 505 shown in FIG. 5.

Referring to FIGS. 6A and 6B, when the decoder core 501 wants to access data with a predetermined size from each of the banks 601 through 604 of the memory 505, the memory control unit 503 transmits an address where the data desired to be accessed is stored, to each of the banks 601 through 604 through an address bus 605.

The memory control unit 503 transmits an address to access data of the bank 0 601 through the address bus 605, and during a latency 607 of FIG. 6B to data access, transmits sequentially corresponding addresses for each of the bank 1 602 through the bank 3 604 to the bank 602 through 604 through the address bus 605. Accordingly, data in the bank 0 through the bank 3 601 through 604 is sequentially accessed and transmitted through a data bus 606. That is, if the bank structure is not used, the latency occurs four times and if an interleaved bank structure is used, data in the four banks is accessed with one latency. Accordingly, the memory having the interleaved bank structure can prevent additional latencies and can access data in the macroblock stored in the memory 505 with one latency.

Meanwhile, referring to FIG. 6C, the memory 505 is formed with 4 banks each having an address access structure independent to each other, and each bank is formed with 3 areas. That is, each of the bank 0 and the bank 1 is divided into a top field area 611 for a luminance component, a bottom field area 613 for a luminance component, and an area for a first chrominance component, and each of the bank 2 and the bank 3 is divided into a top field area 611 for a luminance component, a bottom field are 613 for a luminance component, and an area for a second chrominance component.

Figure 7A:
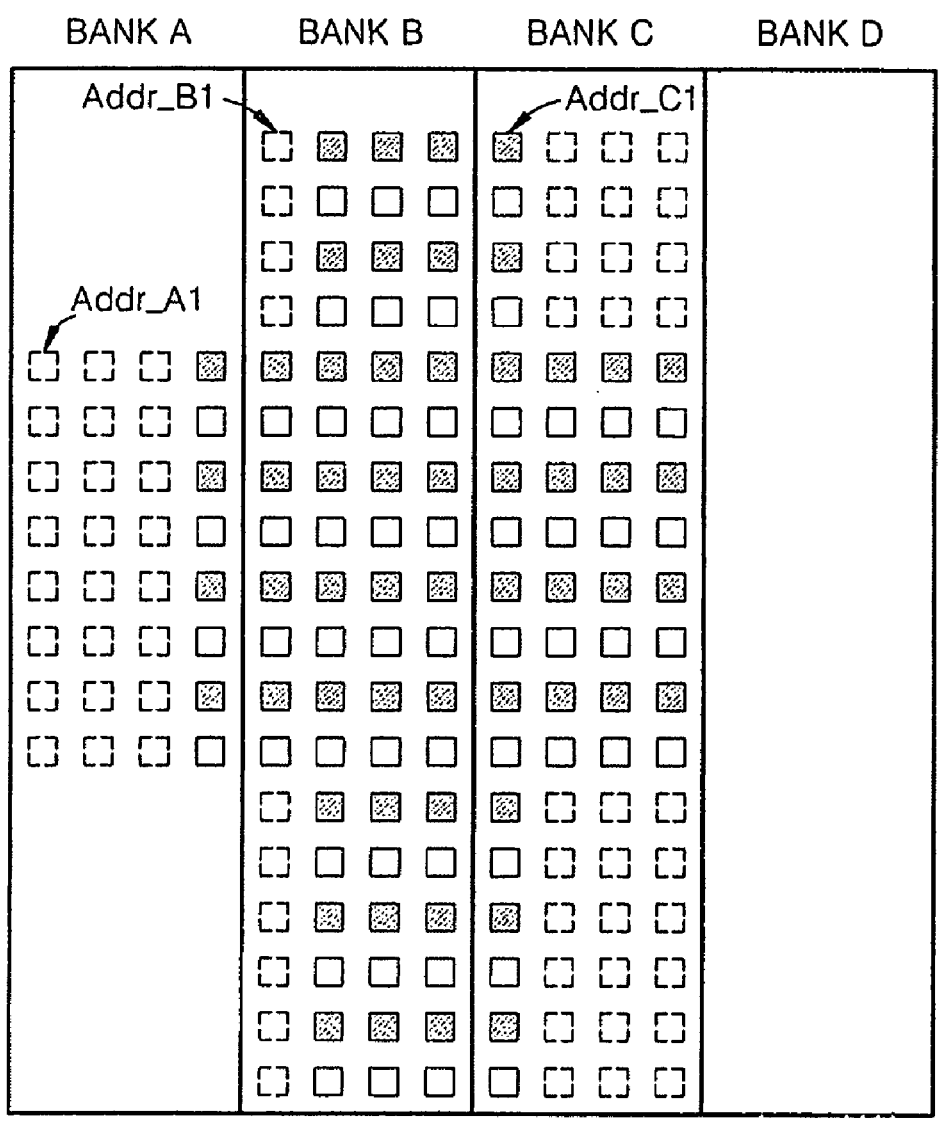
FIGS. 7A and 7B illustrate pixels being accessed for motion compensation of luminance components and chrominance components included in a 4×4 block with a field structure if the memory shown in FIG. 5 has a frame structure.
Figure 7B:
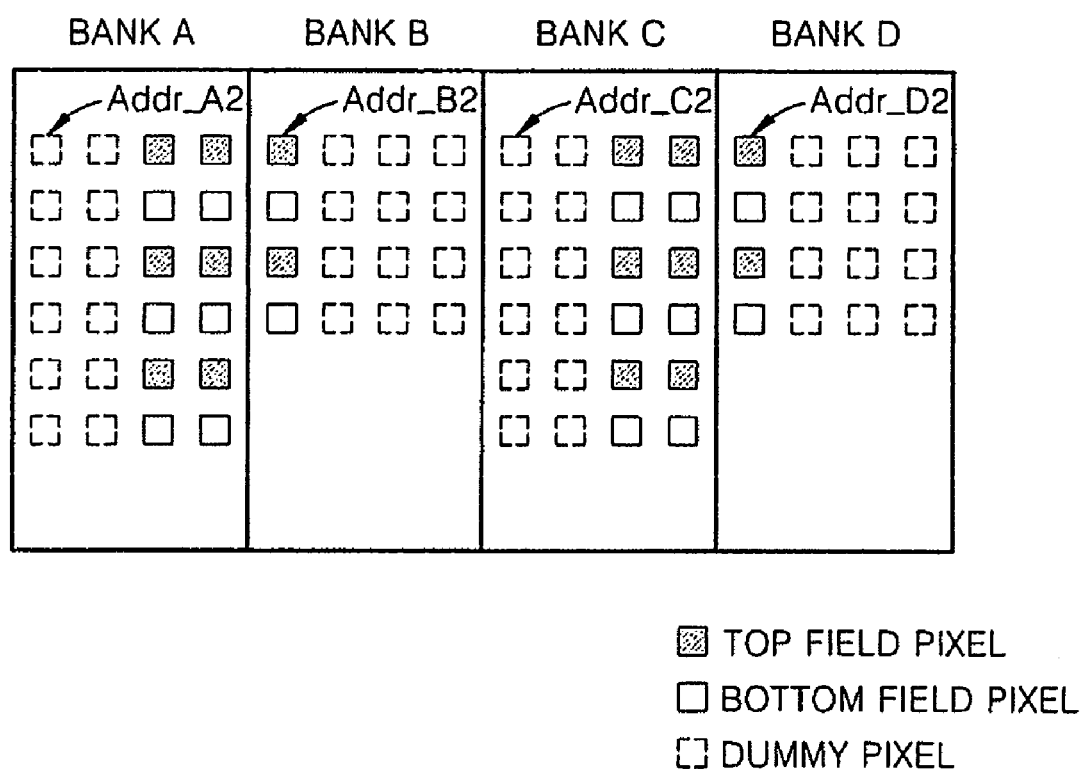

FIGS. 7A and 7B illustrate pixels being accessed for motion compensation of luminance components and chrominance components included in a 4×4 block with a field structure if the memory 505 shown in FIG. 5 has a frame structure. FIGS. 7A and 7B show examples in which pixels of luminance components and chrominance components being accessed are stored spread out in different banks. In order to process a prediction (P-type) macroblock formed with 16 4×4 blocks with a field structure, the memory 119 is accessed in a pipeline method using multi-bank interleaving. This memory access operation is applied to FIGS. 8A through 9B in the same manner.

Referring to FIG. 7A, the luminance component spreads over bank A, bank B, and bank C. Though pixels actually used in the bank A are 8 pixels at the top and bottom fields of the right-hand side edge, 24 dummy pixels are additionally fetched so that a burst mode can be used. In the bank A, if pixels are fetched by using a burst 8 mode, it can be performed in 13 cycles. While the bank A is processed, the initial latency in the bank B is hidden and only 9 cycles that is a time taken when pixels are fetched purely by using a full page mode is used. As in the bank B, also in the bank C, pixel data including dummy pixels can be fetched in 9 cycles by using the full page mode. As a result, for 31 (=13+9+9) cycles, the first 4×4 block data of the luminance component can be fetched, and if the latency taken for loading data on a bus is included, 33 (=31+2) cycles are used. It is assumed that the remaining 15 4×4 blocks are also spread out as in FIG. 7A. When pixel data in the bank A is fetched, the initial latency is hidden during the processing of the first 4×4 blocks and therefore 4 cycles are used. Likewise, the processing of the bank B and the bank C requires 9 cycles each. Accordingly, the processing of the second 4×4 block requires only 22 (=4+9+9) cycles. If it is assumed that all the remaining 4×4 blocks are also spread out in the same form, the processing of luminance pixels in one macroblock requires 363 (=31+22×15+2) cycles.

Referring to FIG. 7B, a first chrominance component (Cr) is stored bank A and bank B and a second chrominance component (Cb) is stored bank C and bank D. After data processing of luminance components of one macroblock is finished, in order to fetch pixel data from the bank A, a full page mode is used and during the processing of the luminance component data, the initial latency is hidden and only 3 cycles are used. In the bank B, during the processing of the luminance component pixel data, the initial latency is hidden and 2 cycles are used by using a burst 4 mode. In the bank C, 9 cycles are used as the sum of 6 cycles not hidden in the initial latency and 3 cycles using a full page mode. In the bank D, the initial latency is hidden and only 2 cycles are used using a burst 4 mode. As a result, in order to fetch the chrominance component pixel data belonging to a 4×4 block, 16 (=3+2+9+2) cycles are used. It is assumed that the chrominance component pixel data belonging to the remaining 15 4×4 blocks is also stored as in FIG. 7B. When pixel data is fetched from the bank A, 5 cycles in the initial latency are hidden and 3 cycles are used to fetch the data. Accordingly, 7 cycles are used. Since the initial latency is all hidden in the bank B, only 2 cycles are used. Since 8 cycles in the initial latency are hidden in the bank C and 3 cycles are used to fetch data, 4 cycles are used. In the bank D, the initial latency is hidden when the pixel data is fetched and 2 cycles are used. Accordingly, the processing of the second chrominance component block requires 15 (=7+2+4+2) cycles. If it is assumed that the remaining 4×4 blocks also requires an average 15 cycles each, the processing of the chrominance component pixel data of one macroblock requires 243 (=16+15×15+2) cycles.

When pixels being accessed are spread out as in FIGS. 7A and 7B, the cycles of one macroblock and the amount of data fetched for motion compensation can be expressed as the following tables 1 and 2:

TABLE 1

|  | Luminance component | | Chrominance component | | Total used cycles |
| --- | --- | --- | --- | --- | --- |
| n-th block | 1 | 2~16 | 1 | 2~16 | |
| Used cycles | 31 | 22 | 16 | 15 | |
| Total | 361 | | 241 | | 604 |

TABLE 2

|  | Data fetched from 4 × 4 block | Sum of data fetched from macroblock |
| --- | --- | --- |
| Luminance | 176 | 2816 |
| Chrominance | 80 | 1280 |
| Total | 256 | 4096 |

Figure 8A:
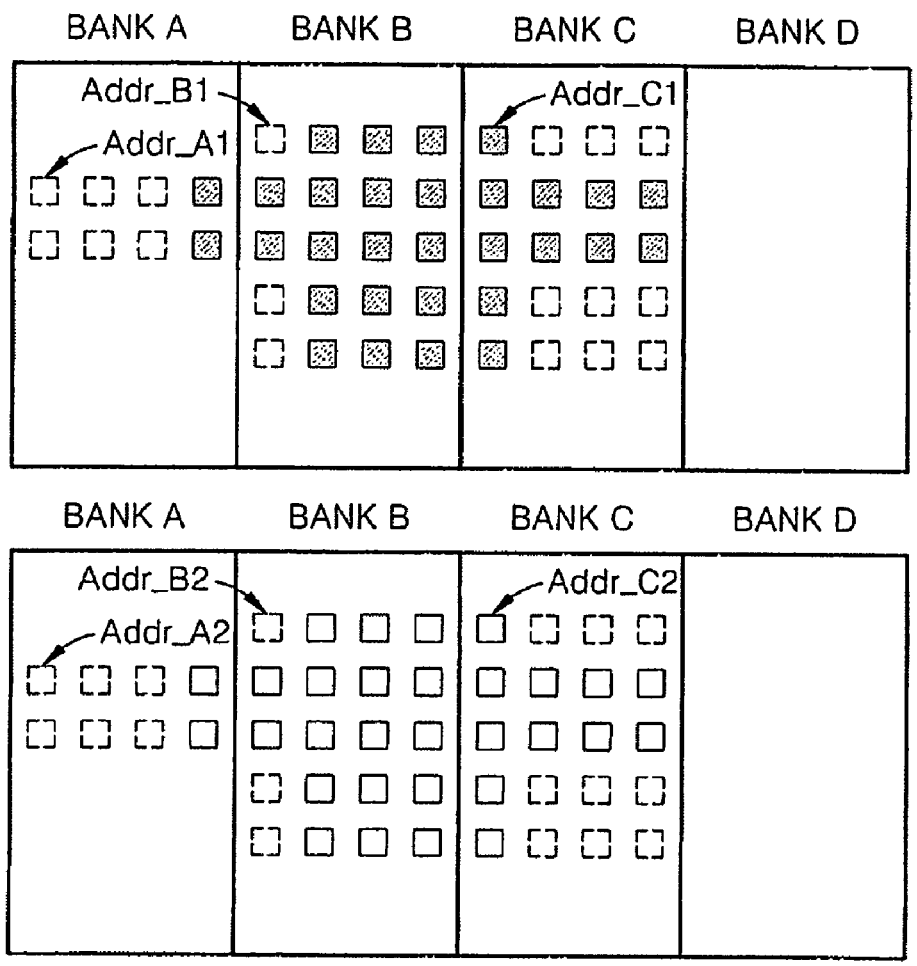
FIGS. 8A and 8B illustrate pixels being accessed for motion compensation of luminance components and chrominance components included in a 4×4 block with a frame structure if the memory shown in FIG. 5 has a field structure.
Figure 8B:
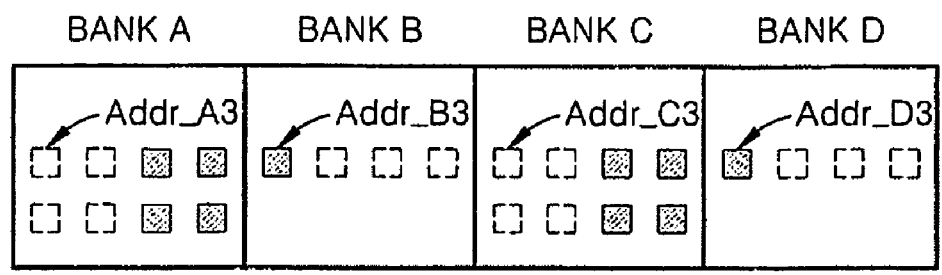
Figure 8B:
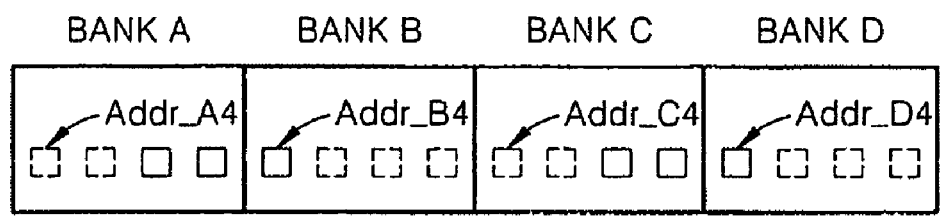

FIGS. 8A and 8B illustrate pixels being accessed for motion compensation of luminance components and chrominance components included in a 4×4 block with a frame structure if the memory 505 shown in FIG. 5 has a field structure. FIGS. 8A and 8B show extreme examples in which pixels of luminance components and chrominance components being accessed are stored in different banks.

When all 16 4×4 blocks are stored in different banks as shown in FIGS. 8A and 8B, fetching of the pixels of the luminance component and the chrominance component requires 454 cycles and 463 cycles, respectively, as shown in the following table 3. Accordingly, if the latency for loading data on a bus is included, total 919 cycles are used.

TABLE 3

|  | Luminance component | | Chrominance component | | Total used cycles |
| --- | --- | --- | --- | --- | --- |
| n-th block | 1 | 2~16 | 1 | 2~16 | |
| Used cycles | 34 | 28 | 28 | 29 | |
| Total | 454 | | 463 | | 919 |

The amount of actually fetched data is 2048 bytes as shown in the following table 4:

TABLE 4

|  | Data fetched from 4 × 4 block | Sum of data fetched from macroblock |
| --- | --- | --- |
| Luminance | 88 | 1408 |
| Chrominance | 40 | 640 |
| Total | 128 | 2048 |

Figure 9A:
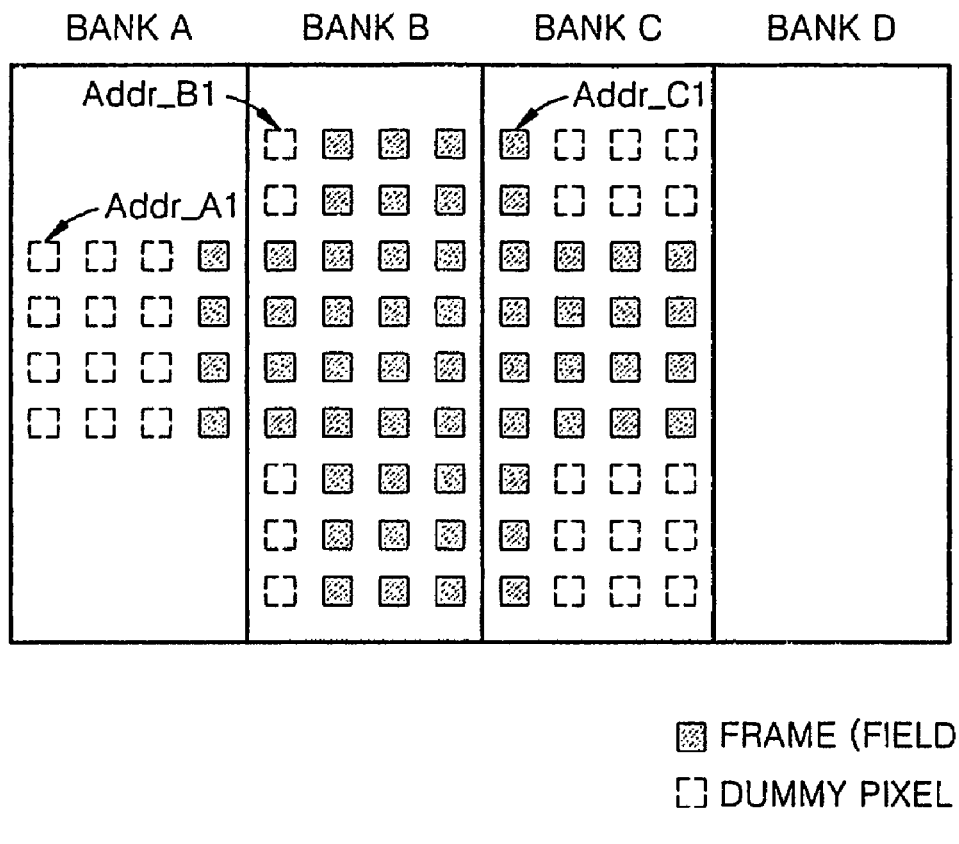
FIGS. 9A and 9B illustrate pixels being accessed for motion compensation of luminance components and chrominance components included in a 4×4 block with a frame (field) structure if the memory shown in FIG. 5 has a frame (field) structure.
Figure 9B:
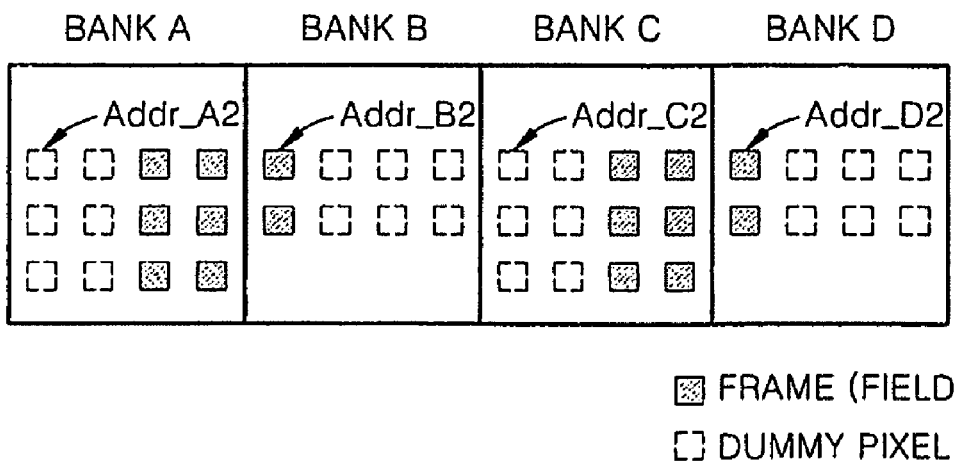

FIGS. 9A and 9B illustrate pixels being accessed for motion compensation of luminance components and chrominance components included in a 4×4 block with a frame (field) structure if the memory 505 shown in FIG. 5 has a frame (field) structure. FIGS. 9A and 9B show examples in which pixels of luminance components and chrominance components being accessed are stored spread out in different banks.

When all 16 4×4 blocks are stored in different banks as shown in FIGS. 9A and 9B, fetching of the pixels of the luminance component and the chrominance component requires 276 cycles and 210 cycles, respectively, as shown in the following table 5. Accordingly, if the latency for loading data on a bus is included, total 488 cycles are used.

TABLE 5

|  | Luminance component | | Chrominance component | | Total used cycles |
|---|---|---|---|---|---|
| n-th block | 1 | 2~16 | 1 | 2~16 | |
| Used cycles | 21 | 17 | 15 | 13 | |
| Total | 276 | | 210 | | 488 |

The amount of actually fetched data is 2048 bytes as shown in the following table 6:

TABLE 6

|  | Data fetched from 4 × 4 block | Sum of data fetched from macroblock |
|---|---|---|
| Luminance | 88 | 1408 |
| Chrominance | 40 | 640 |
| Total | 128 | 2048 |

Figure 10A:
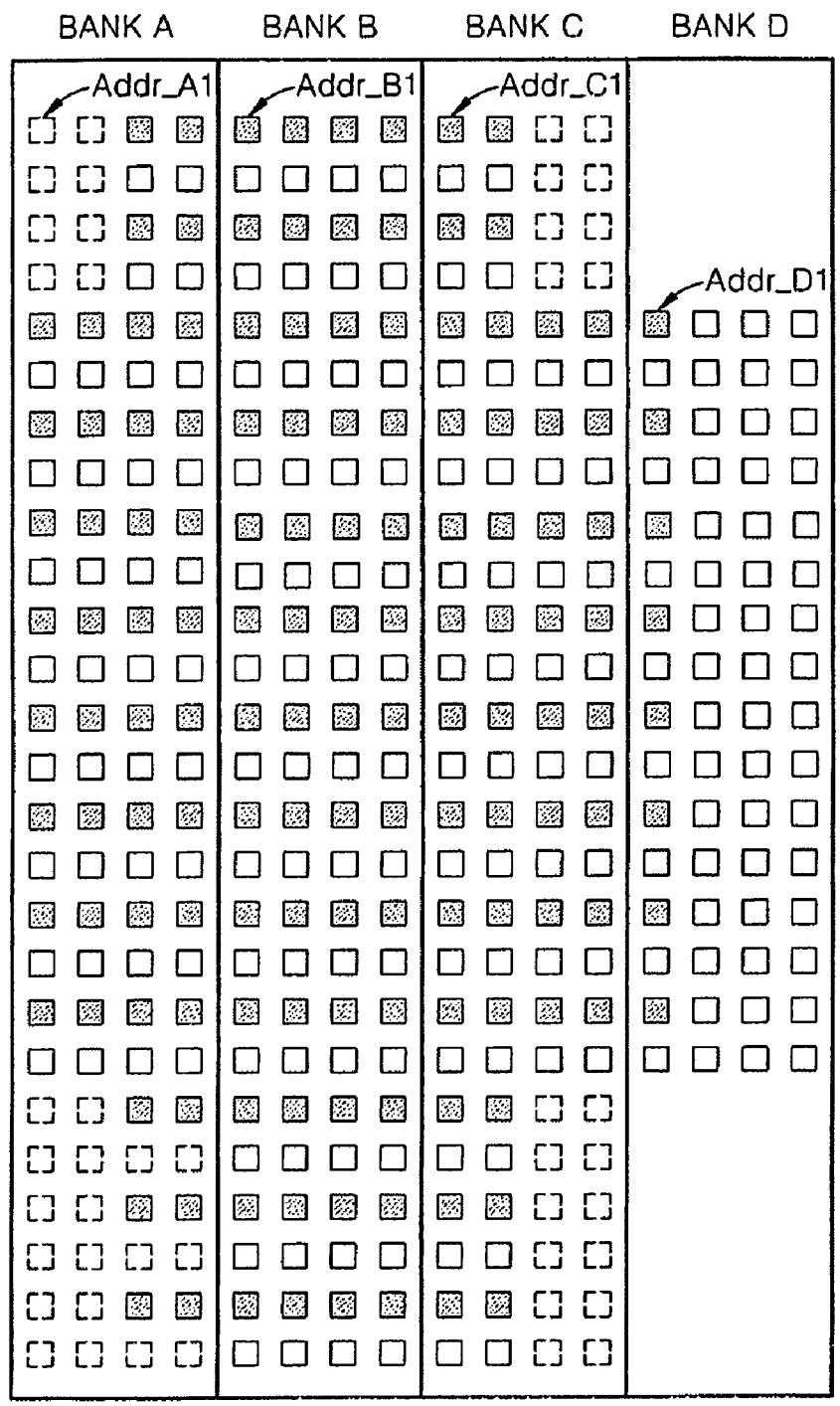
FIGS. 10A and 10B illustrate pixels being accessed for motion compensation of luminance components and chrominance components included in an 8×8 block with a field structure if the memory shown in FIG. 5 has a frame structure.
Figure 10B:
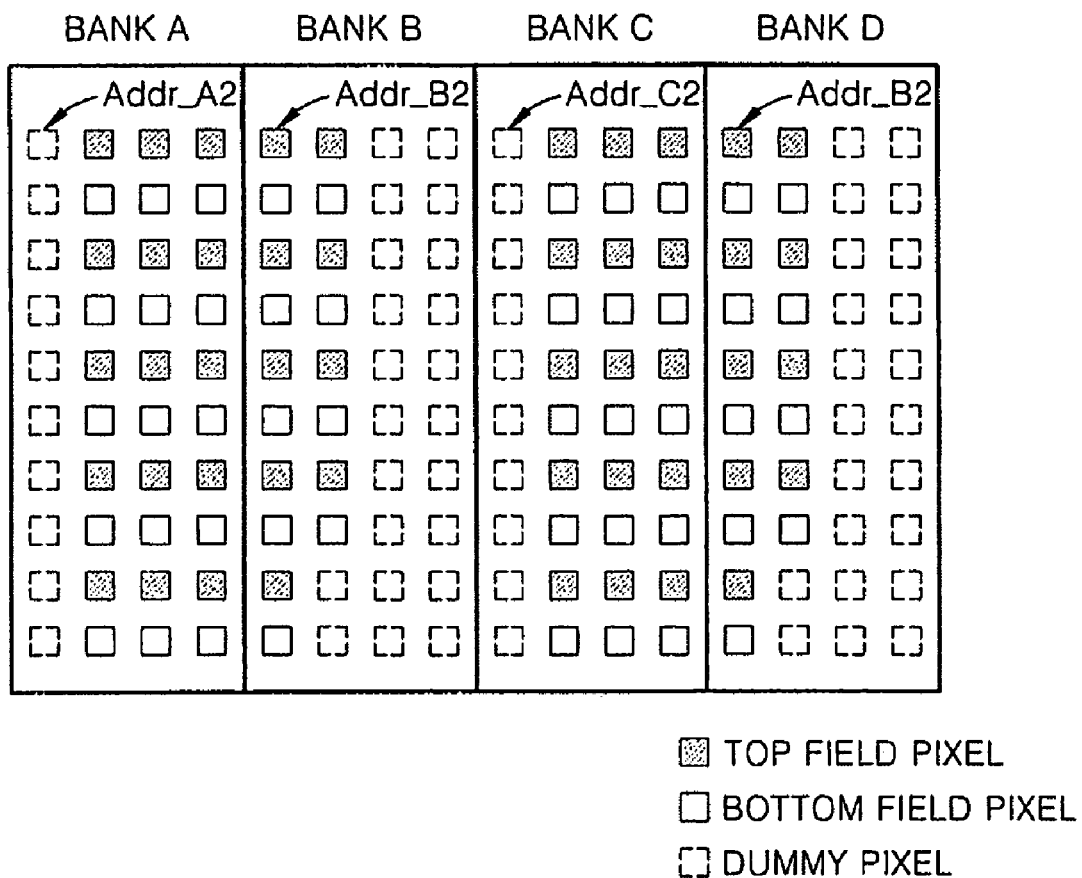

FIGS. 10A and 10B illustrate pixels being accessed for motion compensation of luminance components and chrominance components included in an 8×8 block with a field structure if the memory 505 shown in FIG. 5 has a frame structure. FIGS. 10A and 10B show extreme examples in which pixels of luminance components and chrominance components being accessed are stored in different banks. In order to process a Bi-direction (B-type) macroblock formed with 8 8×8 blocks with a field structure, the memory 119 is accessed in a pipeline method using multi-bank interleaving. This memory access operation is applied to FIGS. 11A through 12B in the same manner.

When all 8 8×8 blocks are stored in different banks as shown in FIGS. 10A and 10B, fetching of the pixels of the luminance component and the chrominance component requires 385 cycles and 160 cycles, respectively, as shown in the following table 7. Accordingly, if the latency for loading data on a bus is included, total 547 cycles are used.

TABLE 7

|  | Luminance component | | Chrominance component | | Total used cycles |
|---|---|---|---|---|---|
| n-th block | 1 | 2~8 | 1 | 2~8 | |
| Used cycles | 56 | 47 | 20 | 20 | |
| Total | 385 | | 160 | | 547 |

The amount of actually fetched data is 4288 bytes as shown in the following table 8:

TABLE 8

|  | Data fetched from 8 × 8 block | Sum of data fetched from macroblock |
|---|---|---|
| Luminance | 376 | 3008 |
| Chrominance | 160 | 1280 |
| Total | 536 | 4288 |

Figure 11A:
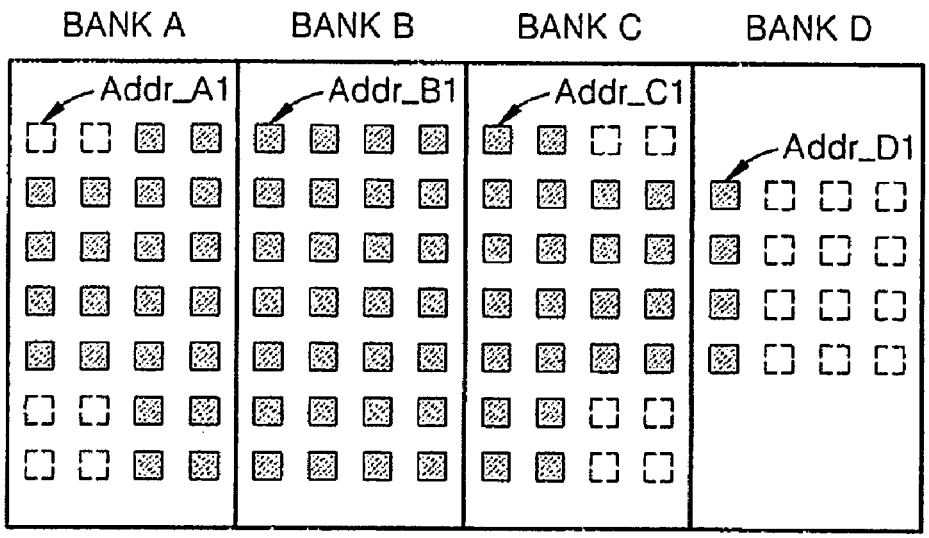
FIGS. 11A and 11B illustrate pixels being accessed for motion compensation of luminance components and chrominance components included in an 8×8 block with a frame structure if the memory shown in FIG. 5 has a field structure.
Figure 11A:
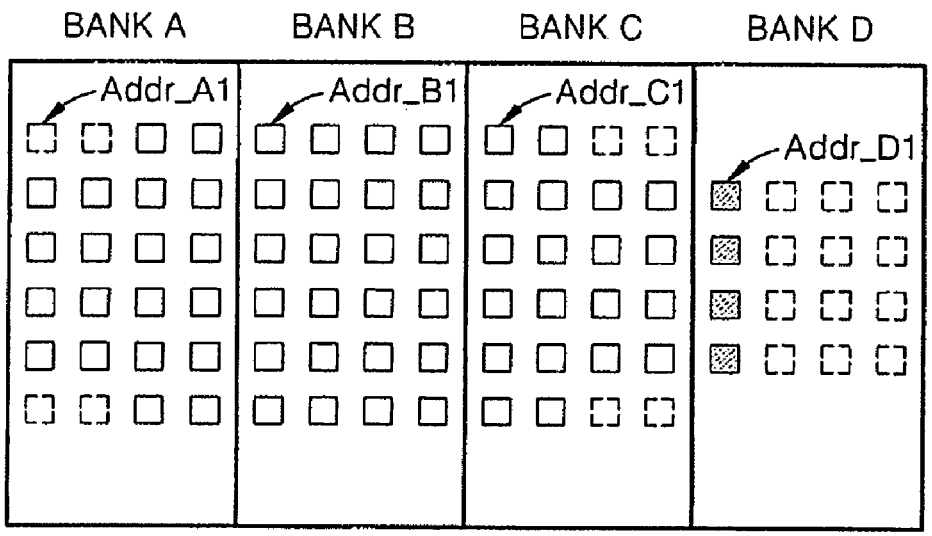
Figure 11B:
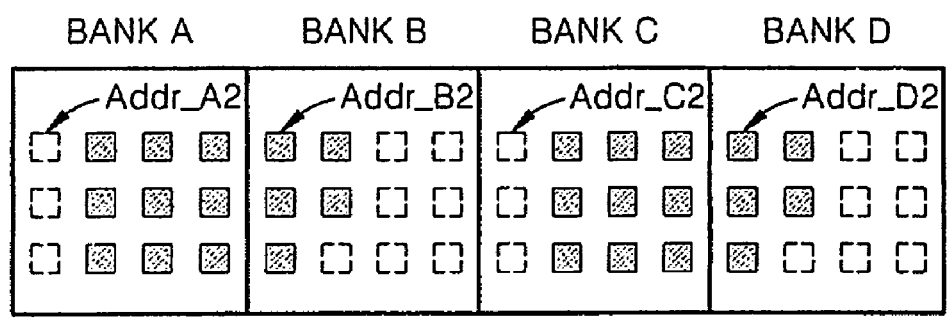
Figure 11B:
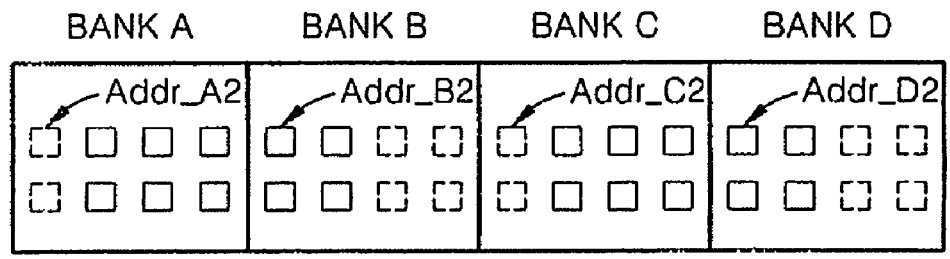

FIGS. 11A and 11B illustrate pixels being accessed for motion compensation of luminance components and chrominance components included in an 8×8 block with a frame structure if the memory 505 shown in FIG. 5 has a field structure. FIGS. 11A and 11B show extreme examples in which pixels of luminance components and chrominance components being accessed are stored in different banks.

When all 8 8×8 blocks are stored out in different banks as shown in FIGS. 11A and 11B, fetching of the pixels of the luminance component and the chrominance component requires 270 cycles and 236 cycles, respectively, as shown in the following table 9. Accordingly, if the latency for loading data on a bus is included, total 508 cycles are used.

TABLE 9

|  | Luminance component | | Chrominance component | | Total used cycles |
|---|---|---|---|---|---|
| n-th block | 1 | 2~8 | 1 | 2~8 | |
| Used cycles | 39 | 33 | 26 | 30 | |
| Total | 270 | | 236 | | 508 |

The amount of actually fetched data is 2144 bytes as shown in the following table 10:

TABLE 10

|  | Data fetched from 8 × 8 block | Sum of data fetched from macroblock |
|---|---|---|
| Luminance | 188 | 1504 |
| Chrominance | 80 | 640 |
| Total | 268 | 2144 |

Figure 12A:
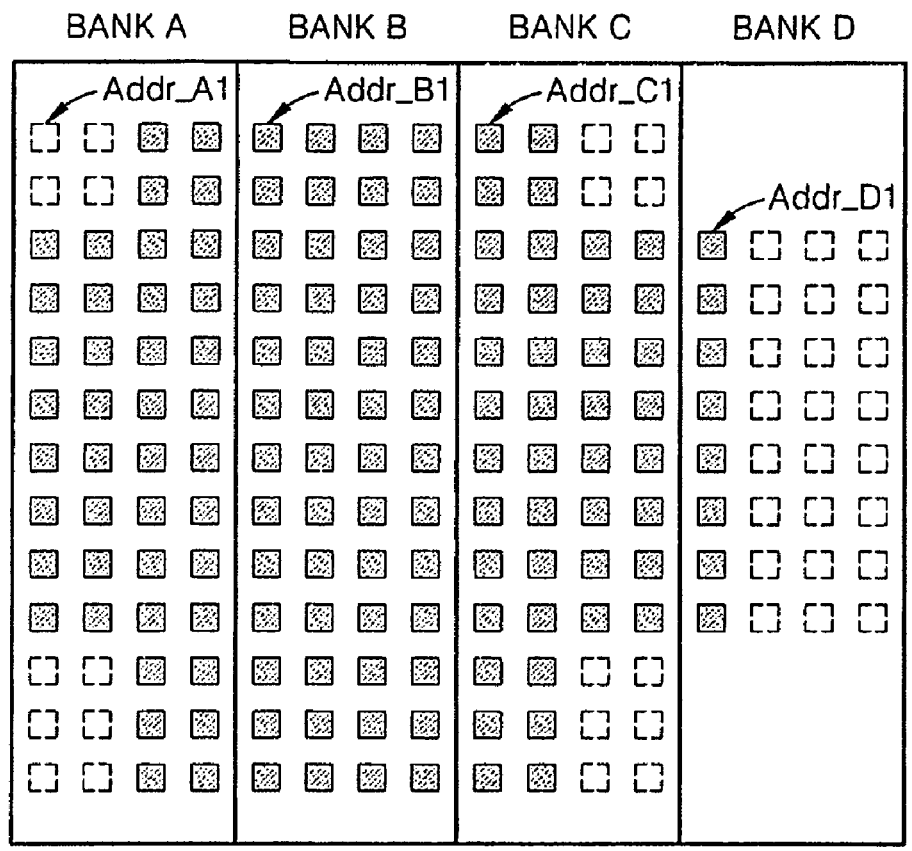
FIGS. 12A and 12B illustrate pixels being accessed for motion compensation of luminance components and chrominance components included in an 8×8 block with a frame (field) structure if the memory shown in FIG. 5 has a frame (field) structure.
Figure 12B:
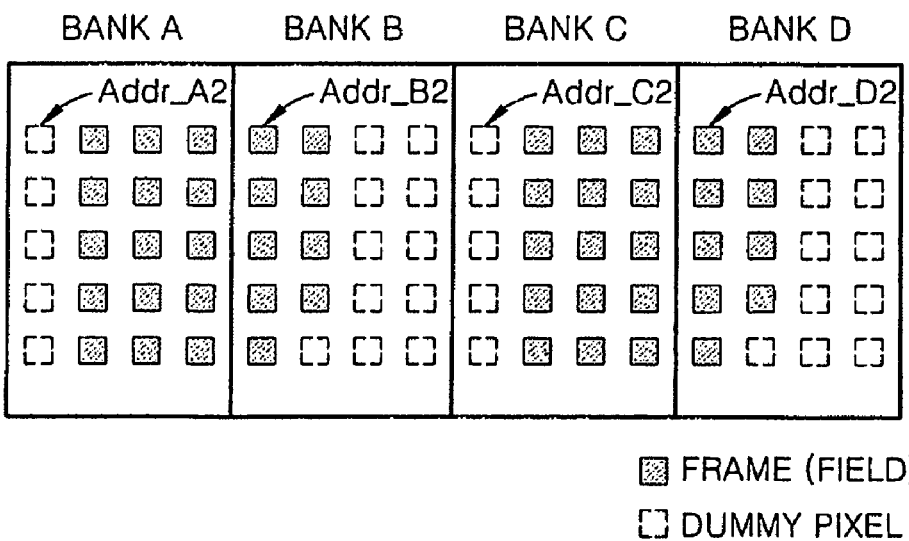

FIGS. 12A and 12B illustrate pixels being accessed for motion compensation of luminance components and chrominance components included in an 8×8 block with a frame (field) structure if the memory 505 shown in FIG. 5 has a frame (field) structure. FIGS. 12A and 12B show examples in which pixels of luminance components and chrominance components being accessed are stored in different banks.

When all 8 8×8 blocks are stored in different banks as shown in FIGS. 12A and 12B, fetching of the pixels of the luminance component and the chrominance component requires 209 cycles and 118 cycles, respectively, as shown in the following table 11. Accordingly, if the latency for loading data on a bus is included, total 329 cycles are used.

TABLE 11

|  | Luminance component | | Chrominance component | | Total used cycles |
|---|---|---|---|---|---|
| n-th block | 1 | 2~8 | 1 | 2~8 | |
| Used cycles | 34 | 25 | 13 | 15 | |
| Total | 209 | | 118 | | 329 |

The amount of actually fetched data is 2144 bytes as shown in the following table 12:

TABLE 12

|  | Data fetched from 8 × 8 block | Sum of data fetched from macroblock |
|---|---|---|
| Luminance | 188 | 1504 |
| Chrominance | 80 | 640 |
| Total | 266 | 2144 |

Figure 13:
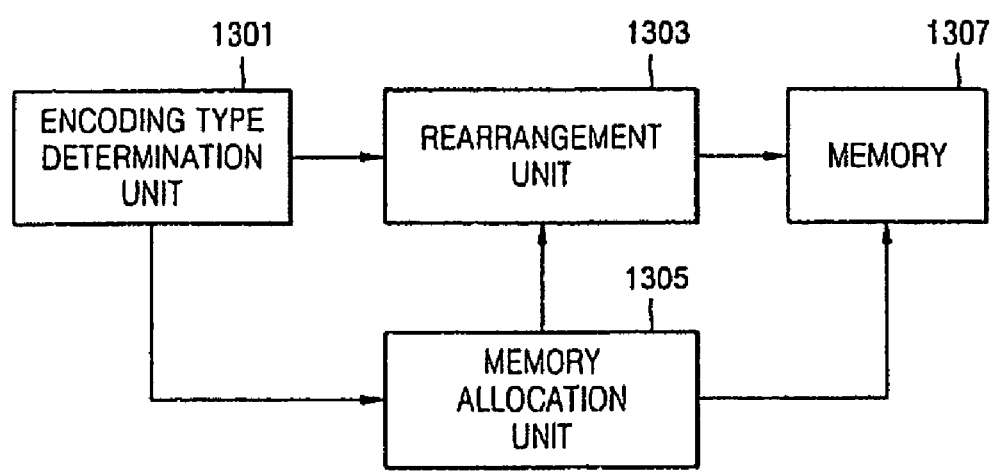
FIG. 13 is a block diagram of the structure of an apparatus for controlling data writing according to an embodiment of the present invention.

FIG. 13 is a block diagram of the structure of an apparatus for controlling data writing according to an embodiment of the present invention, which includes an encoding type determination unit 1301, a rearrangement unit 1303, a memory allocation unit 1305, and a memory 1307. Here, it is possible to implement the encoding type determination unit 1301, the rearrangement unit 1303, and the memory allocation unit 1305 as an element corresponding to the memory control unit 503 of FIG. 5.

Referring to FIG. 13, the encoding type determination unit 1301 determines whether the encoding type of each macroblock included in processed image data is a frame unit or a field unit. The encoding type is included in the header of each macroblock according to an embodiment of the present invention.

According to the encoding type determined in the encoding type determination unit 1301, the rearrangement unit 1303 rearranges a luminance component belonging to one macroblock in units of fields, and rearranges a chrominance component in units of frames. According to this, a luminance component belonging to a macroblock whose encoding type is a frame unit is rearranged in units of fields, while a rearrangement process of the chrominance component of the macroblock is omitted. Meanwhile, a rearrangement process of a luminance component belonging to a macroblock whose encoding type is a field unit is omitted, and the chrominance component of the macroblock is rearranged in units of frames.

The memory allocation unit 1305 allocates addresses so that the luminance component and the chrominance component of each macroblock provided by the rearrangement unit 1303 can be stored in respective corresponding areas in each bank of the memory 1307. The memory allocation unit 1305 generates and manages an address correspondence table indicating the correspondence relations of the top field and bottom field of a luminance component, a first chrominance component (Cr), and a second chrominance component (Cb) belonging to each macroblock with each bank.

The memory 1307 includes at least one or more banks that can be accessed independently to each other, for example, 4 banks, and each bank includes 3 areas and stores data corresponding to the top field area and bottom field area of a luminance component, a first chrominance component area and a second chrominance component area.

Figure 14:
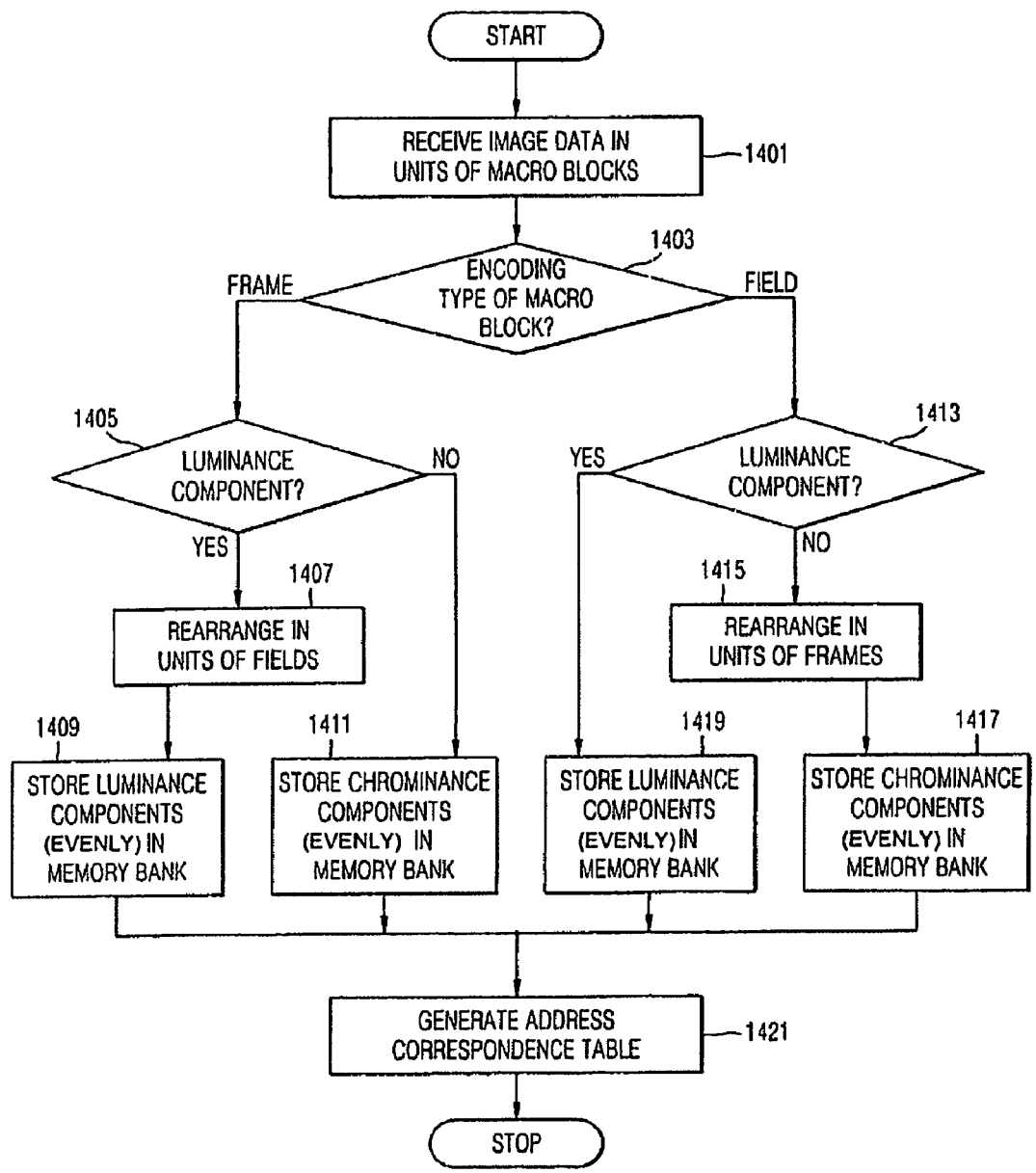
FIG. 14 is a flowchart of the operations performed by a method to control data writing according to an embodiment of the present invention.

FIG. 14 is a flowchart of the operations performed by a method for controlling data writing according to an embodiment of the present invention.

Referring to FIG. 14, in operation 1401, processed image data is received in units of macroblocks.

In operation 1403, it is determined whether the encoding type of the received macroblock is a frame unit or a field unit.

In operation 1405, if the determination result of operation 1403 indicates that the encoding type of the macroblock is a frame unit, it is determined whether the input data corresponds to a luminance component or a chrominance component.

In operation 1407, if the determination result of operation 1405 indicates that the input data corresponds to a luminance component, the data is rearranged in units of fields.

In operation 1409, the luminance component corresponding to the top field in the rearrangement result in operation 1407 is evenly stored in the top field area ($Y_{top}$; 611 of FIG. 6C) of each bank (B0, B1, B2, B3; 601 through 604 of FIG. 6A) as shown in FIG. 4A. Meanwhile, the luminance component corresponding to the bottom field is evenly stored in the bottom field area ($Y_{bot}$; 613 of FIG. 6C) of each bank (B0, B1, B2, B3; 601 through 604 of FIG. 6A) as shown in FIG. 4A.

In operation 1411, if the determination result of operation 1405 indicates that the input data corresponds to a chrominance component, the rearrangement process is omitted and the first chrominance component is evenly stored in the chrominance component area 615 of the bank 0 and the bank 1, and the second chrominance component is evenly stored in the chrominance component area 617 of the bank 2 and the bank 3 as shown in FIG. 4B.

Meanwhile, in operation 1413, if the determination result of operation 1403 indicates that the encoding type of the macroblock is a frame unit, it is determined whether the input data corresponds to a luminance component or a chrominance component.

In operation 1415, if the determination result of operation 1413 indicates that the input data corresponds to a chrominance component, the data is rearranged in units of frames.

In operation 1417, in the rearrangement result of operation 1415, the first chrominance component is evenly stored in the chrominance component area 615 of the bank 0 and the bank 1, and the second chrominance component is stored evenly in the chrominance component area 617 of the bank 2 and the bank 3 as shown in FIG. 4B.

In operation 1419, if the determination result of operation 1413 indicates that the input data corresponds to a luminance component, the rearrangement process is omitted, and the luminance component corresponding to the top field is evenly stored in the top field area ($Y_{top}$; 611 of FIG. 6C) of each bank (B0, B1, B2, B3; 601 through 604 of FIG. 6A) as shown in FIG. 4A. Meanwhile, the luminance component corresponding to the bottom field is evenly stored in the bottom field area ($Y_{bot}$; 613 of FIG. 6C) of each bank (B0, B1, B2, B3; 601 through 604 of FIG. 6A) as shown in FIG. 4A.

Figure 15:
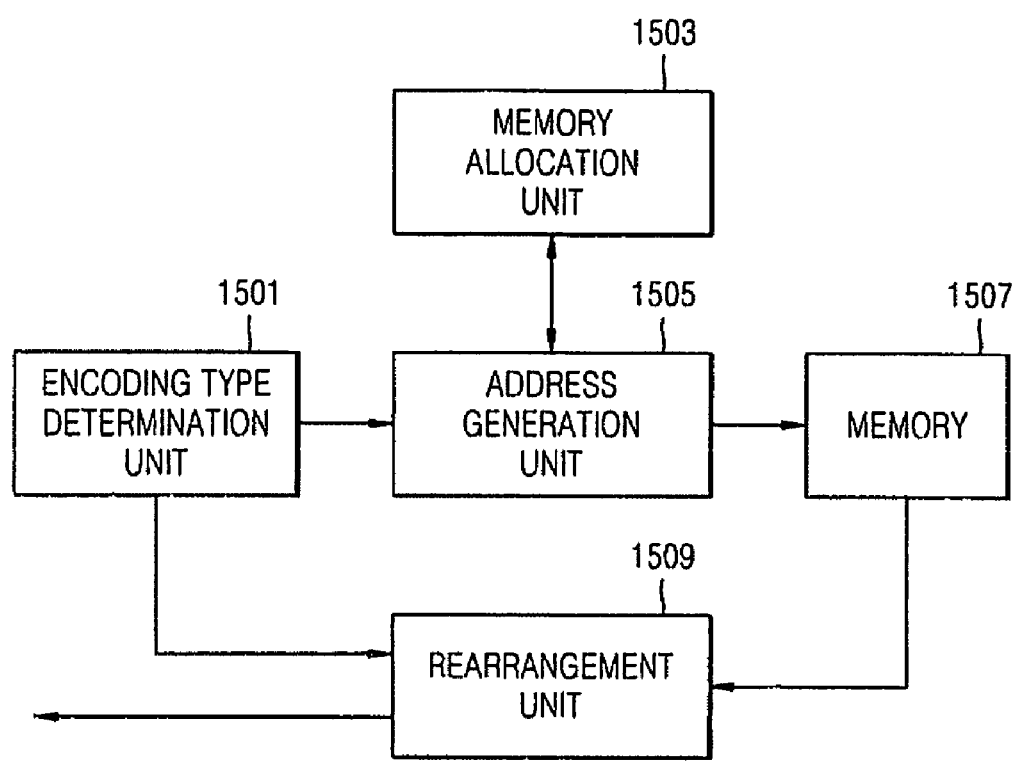
FIG. 15 is a block diagram of an apparatus for controlling data reading according to an embodiment of the present invention.

FIG. 15 is a block diagram of an apparatus for controlling data reading according to an embodiment of the present invention, which includes an encoding type determination unit 1501, a memory allocation unit 1503, an address generation unit 1505, a memory 1507, and a rearrangement unit 1509. Here, it is possible to implement the encoding type determination unit 1501, the memory allocation unit 1503, the address generation unit 1505, and the rearrangement unit 1509 as an element corresponding to the memory control unit 503 of FIG. 5. Meanwhile, the memory allocation unit 1503 and the memory 1507 are the same elements as in FIG. 13.

Referring to FIG. 15, the encoding type determination unit 1501 determines the encoding type of a macroblock input to perform a prediction process.

The memory allocation unit 1503 generates and manages an address correspondence table constructed with addresses at which the luminance component and chrominance component belonging to each macroblock of the processed image data are stored.

The address generation unit 1505 generates an address at which a luminance component and a chrominance component to be accessed in the memory 1507, by referring to the address correspondence table stored in the memory allocation unit 1503.

The memory 1507 stores a luminance component after mapping into a field structure, and a chrominance component after mapping into a frame structure. The memory 1507 reads the luminance component and the chrominance component corresponding to the address generated in the address generation unit 1505, and provides the read components to the rearrangement unit 1509.

According to the encoding type determined in the encoding type determination unit 1501, the rearrangement unit 1509 rearranges the luminance component or the chrominance component and provides the rearranged component to the decoder core (501 of FIG. 5). That is, if the encoding type of a macroblock is a frame unit, the luminance component read from the memory 1507 is rearranged in units of frames, and the rearrangement process of the chrominance component is omitted. Meanwhile, if the encoding type of a macroblock is a field unit, the rearrangement process of the luminance component read from the memory 1507 is omitted and the chrominance component is rearranged in units of fields.

FIG. 16 is a flowchart of the operations performed by a method for controlling data reading according to an embodiment of the present invention.

Referring to FIG. 16, in operation 1601, image data is received in units of macroblocks in order to perform a prediction process.

In operation 1603, it is determined whether the encoding type of the received macroblock is a frame unit or a field unit.

In operation 1605, if the determination result of operation 1603, if the encoding type of the macroblock is a frame unit, it is determined whether the input data corresponds to a luminance component or a chrominance component.

In operation 1607, if the determination result of operation 1605 indicates that the input data corresponds to a luminance component, the luminance component data required for the prediction process is accessed in the memory 1507 by referring to the address correspondence table.

In operation 1609, the luminance component data accessed in operation 1607 is rearranged in units of frames, and provided to the prediction module (115 of FIG. 1) in operation 1621.

In operation 1611, if the determination result of operation 1605, if the input data corresponds to a chrominance component, the chrominance component data required for the prediction process is accessed in the memory 1507 by referring to the address correspondence table, and without the rearrangement process, is provided to the prediction module (115 of FIG. 1) in operation 1621.

Meanwhile, in operation 1613, if the determination result of operation 1603 indicates that the encoding type of the macroblock is a field unit, it is determined whether the input data corresponds to a luminance component or a chrominance component.

In operation 1615, if the determination result of operation 1613 indicates that the input data corresponds to a luminance component, the luminance component data used for the prediction process is accessed in the memory 1507 by referring to the address correspondence table, and without the rearrangement process, is provided to the prediction module (115 of FIG. 1) in operation 1621.

In operation 1617, if the determination result of operation 1613 indicates that the input data corresponds to a chrominance component, the chrominance component data used for the prediction process is accessed in the memory 1507 by referring to the address correspondence table.

In operation 1619, the chrominance component data accessed in operation 1617 is rearranged in units of fields and provided to the prediction module (115 of FIG. 1) in operation 1621.

Meanwhile, when the bus bandwidths are identically 64 bits, the comparison of used cycles, memory access amounts, and required operational frequencies between a case where a luminance component is mapped in a field structure and a chrominance component is mapped in a frame structure in a memory according to an embodiment of the present invention, and a case where both the luminance component and the chrominance component are mapped in a frame structure, can be shown as in the following table 13:

TABLE 13

| Memory structure<br>Luminance/Chrominance | Frame/frame | Field/frame |
|---|---|---|
| Inter prediction - used cycles | 277 | 227 |
| Inter prediction - memory access amounts | 2463 | 1604 |
| Operational frequency | 133 MHz | 120 MHz |
| Bus bandwidth | 64 bits | 64 bits |

Referring to table 13, when inter prediction is performed, it can be seen that the used cycles improved by about 18%, the memory access amount improves by about 35%, and the operational frequency improves about 10%.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

As described above, in the apparatus and method for controlling data writing and/or reading according to the present invention in an image processing system, a luminance component is mapped into a field structure and a chrominance component is mapped into a frame structure to write data in or read data from a memory. By doing so, the number of used cycles and the amount of fetched data can be minimized.

While the present invention has been particularly shown and described with reference to exemplary embodiments thereof, it will be understood by those of ordinary skill in the art that various changes in form and details may be made therein without departing from the spirit and scope of the present invention as defined by the following claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for controlling data writing in an image processing system, comprising:
a memory formed with a plurality of banks capable of being accessed independently; and
a memory control unit to control so that a luminance component and a chrominance component, including a first chrominance component and a second chrominance component, belonging to a same macroblock are written based on respective structures different from each other, of a frame and a field, in the memory,
wherein the first chrominance component is divided and stored in some banks of the plurality of banks and the second chrominance component is divided and stored in a remainder of the plurality of banks and the plurality of banks are accessed at a burst mode.

2. The apparatus of claim 1, wherein the memory comprises four banks, and in each bank data is read and written independently to other banks.

3. The apparatus of claim 1, wherein the memory control unit writes the luminance component in the field structure in the memory and the first and second chrominance components in the frame structure in the memory.

4. The apparatus of claim 3, wherein the memory control unit evenly divides and stores the luminance component belonging to the macroblock in four banks, and evenly divides and stores the first and second chrominance components in respective two banks.

5. The apparatus of claim 1, wherein the memory control unit rearranges one of the luminance component and the chrominance component belonging to the same macroblock according to an encoding type of each of the macroblocks.

6. An apparatus for controlling data writing in an image processing system, comprising:
 a memory formed with a plurality of banks capable of being accessed independently; and
 a memory control unit to control so that a luminance component and a chrominance component, including a first chrominance component and a second chrominance component, belonging to a same macroblock are written based on respective structures different from each other, in the memory,
 wherein the memory control unit comprises:
 an encoding type determination unit to determine whether an encoding type of each of the macroblocks is a frame unit or a field unit;
 a rearrangement unit to rearrange the luminance component belonging to the same macroblock in units of fields and rearranging the first and second chrominance components in units of frames according to the encoding type; and
 a memory allocation unit to allocate addresses so that the luminance component and the first and second chrominance components belonging to the macroblock provided by the rearrangement unit are written in each bank of the memory, and generating an address correspondence table according to an allocation result.

7. A method for controlling data writing in an image processing system, comprising:
 providing a memory formed with a plurality of banks capable of being accessed independently; and
 controlling so that a luminance component and a chrominance component, including a first chrominance component and a second chrominance component, belonging to one macroblock are written based on respective structures different to each other, of a frame and a field, in the memory,
 wherein the first chrominance component is divided and stored in some banks of the plurality of banks and the second chrominance component is divided and stored in a remainder of the plurality of banks and the plurality of banks are accessed at a burst mode.

8. The method of claim 7, wherein the memory comprises four banks, and in each bank data is read and written independently to other banks.

9. The method of claim 7, wherein in the controlling of the memory, the luminance component is written in the field structure in the memory and the first and second chrominance components are written in the frame structure in the memory.

10. The method of claim 9, wherein in the controlling of the memory, the luminance component belonging to the macroblock is divided and stored in four banks, and the first and second chrominance components are divided and stored in respective two banks.

11. The method of claim 7, wherein in the controlling of the memory, one of the luminance component and the chrominance component belonging to the same macroblock is rearranged according to an encoding type of each of the macroblocks.

12. A method for controlling data writing in an image processing system, comprising:
 providing a memory formed with a plurality of banks capable of being accessed independently; and
 controlling so that a luminance component and a chrominance component, including a first chrominance component and a second chrominance component, belonging to one macroblock are written based on respective structures different to each other, in the memory,
 wherein the controlling of the memory comprises:
 determining whether an encoding type of each of the macroblocks is a frame unit or a field unit;
 according to the encoding type, rearranging the luminance component belonging to the macroblock in units of fields and rearranging the first and second chrominance components in units of frames; and
 allocating addresses so that a rearranged luminance component and rearranged first and second chrominance components belonging to the macroblock are written in each bank of the memory, and generating an address correspondence table according to an allocation result.

13. An apparatus to control data reading in an image processing system, comprising:
 a memory formed with a plurality of banks capable of being accessed independently in which a luminance component and a chrominance component, including a first chrominance component and a second chrominance component, belonging to one macroblock are written based on respective structures different to each other, of a frame and a field, in each bank of the memory; and
 a memory control unit to control so that the luminance component, the first chrominance component, and the second chrominance component required are read from the memory,
 wherein the first chrominance component is divided and stored in some banks of the plurality of banks and the second chrominance component is divided and stored in a remainder of the plurality of banks and the plurality of banks are accessed at a burst mode.

14. The apparatus of claim 13, wherein the memory comprises four banks, and in each bank data is read and written independently to other banks.

15. The apparatus of claim 13, wherein the luminance component is written in the field structure in the memory and the first and second chrominance components are written in the frame structure in the memory.

16. The apparatus of claim 15, wherein the luminance component belonging to the macroblock is evenly divided and stored in four banks, and the first and second chrominance components of the macroblock are evenly divided and stored in respective two banks.

17. The apparatus of claim 13, wherein one of the luminance component and the chrominance component belonging to the same macroblock is rearranged according to an encoding type of each of the macroblocks, prior to being written in the memory.

18. An apparatus to control data reading in an image processing system, comprising:
- a memory formed with a plurality of banks capable of being accessed independently in which a luminance component and a chrominance component, including a first chrominance component and a second chrominance component, belonging to one macroblock are written based on respective structures different to each other, in each bank of the memory; and
- a memory control unit to control so that the luminance component, the first chrominance component, and the second chrominance component required are read from the memory,
- wherein the memory control unit comprises:
- a memory allocation unit to allocate a first plurality of addresses so that the luminance component and the first and second chrominance components belonging to the macroblock are written in each bank of the memory, and generate an address correspondence table according to an allocation result;
- an encoding type determination unit to determine whether an encoding type of each of the macroblocks is a frame unit or a field unit;
- an address generation unit to generate a second plurality of addresses to read the luminance component and the first and second chrominance components from the memory by referring to the address correspondence table; and
- a rearrangement unit to rearrange the luminance component read from the second plurality of addresses of the memory in units of frames and rearranqe the first and second chrominance components in units of fields, according to the encoding type.

19. A method for controlling data reading in an image processing system, comprising:
- providing a memory formed with a plurality of banks capable of being accessed independently in which a luminance component and a chrominance component including, a first chrominance component and a second chrominance component, belonging to one macroblock are written based on respective structures different to each other, of a frame and a field, in each bank of the memory; and
- controlling so that the luminance component, the first chrominance component, and the second chrominance component required are read from the memory,
- wherein the first chrominance component is divided and stored in some banks of the plurality of banks and the second chrominance component is divided and stored in a remainder of the plurality of banks and the plurality of banks are accessed at a burst mode.

20. The method of claim 19, wherein the memory comprises four banks, and in each bank data is read and written independently to other banks.

21. The method of claim 19, wherein the luminance component is written in the field structure in the memory and the first and second chrominance components are written in the frame structure in the memory.

22. The method of claim 21, wherein the luminance component belonging to the macroblock is evenly divided and stored in four banks, and the first and second chrominance components are evenly divided and stored in respective two banks.

23. The method of claim 19, wherein one of the luminance component and the chrominance component belonging to the same macroblock is rearranged a ccording to an encoding type of each of the macroblocks, prior to being written in the memory.

24. A method for controlling data reading in an image processing system, comprising:
- providing a memory formed with a plurality of banks capable of being accessed independently in which a luminance component and a chrominance component, including a first chrominance component and a second chrominance component, belonging to one macroblock are written based on respective structures different to each other, in each bank of the memory; and
- controlling so that the luminance component, the first chrominance component, and the second chrominance component required are read from the memory,
- wherein the controlling of the memory comprises:
- allocating a first plurality of addresses so that the luminance component and the first and second chrominance components belonging to the macroblock are written in each bank of the memory, and generating an address correspondence table according to an allocation result;
- determining whether an encoding type of each of the macroblocks is a frame unit or a field unit;
- generating a second plurality of addresses to read the luminance component and the first and second chrominance components from the memory by referring to the address correspondence table; and
- according to the encoding type rearranging the luminance component read from the second plurality of addresses of the memory in units of frames and rearranging the first and second chrominance components in units of fields.

25. An apparatus to control data writing and reading in an image processing system, comprising:
- a memory formed with a plurality of banks capable of being accessed independently in which a luminance component and a chrominance component, including a first chrominance component and a second chrominance component, belonging to one macroblock are written based on respective structures different to each other, in each bank of the memory; and
- a memory control unit to control so that the luminance component, the first chrominance component and the second chrominance component belonging to the macroblock are written based on respective structures different to each other, of a frame and a field, in the memory, and to control so that the luminance component, the first chrominance component, and the second chrominance component required are read from the memory,
- wherein the first chrominance component is divided and stored in some banks of the plurality of banks and the second chrominance component is divided and stored in remainder of the plurality of banks and the plurality of banks are accessed at a burst mode.

26. The apparatus of claim 25, wherein the memory control unit comprises:
- an encoding type determination unit to determine whether an encoding type of each of the macroblocks is a frame unit or a field unit;
- a rearrangement unit to rearrange the luminance component belonging to the macroblock in units of fields and rearrange the first and second chrominance components in units of frames according to the encoding type; and
- a memory allocation unit to allocate addresses so that the luminance component and the first and second chrominance components belonging to the macroblock provided by the rearrangement unit are written in each bank of the memory, and generate an address correspondence table according to an allocation result.

27. The apparatus of claim 25, wherein the memory control unit comprises:
- a memory allocation unit to allocate addresses so that the luminance component and the first and second chrominance components belonging to the macroblock are written in each bank of the memory, and generate an address correspondence table according to an allocation result;
- an encoding type determination unit to determine whether an encoding type of each of the macroblocks is a frame unit or a field unit;
- an address generation unit to generate addresses to read the luminance component and the first and second chrominance components from the memory by referring to the address correspondence table; and
- a rearrangement unit to rearrange the luminance component read from the addresses of the memory in units of frames and rearrange the first and second chrominance components in units of fields according to the encoding type.

28. The apparatus of claim 25, wherein the memory comprises four banks;
- in each bank data is read and written independently to other banks;
- the luminance component is written in the field structure in the memory; and
- the first and second chrominance components are written in the frame structure in the memory.

29. The apparatus of claim 25, wherein the memory control unit rearranges one of the luminance component and the chrominance component belonging to the same macroblock according to an encoding type of each of the macroblocks.

30. A method to control data writing and reading in an image processing system, comprising:
- providing a memory formed with a plurality of banks capable of being accessed independently in which a luminance component and a chrominance component, including a first chrominance component and a second chrominance component, belonging to one macroblock are written based on respective structures different to each other, in each bank of the memory;
- controlling so that the luminance component, the first chrominance component and the second chrominance component belonging to the macroblock are written based on respective structures different to each other, of a frame and a field, in the memory; and
- controlling so that the luminance component, the first chrominance component, and the second chrominance component required are read from the memory,
- wherein the first chrominance component is divided and stored in some banks of the plurality of banks and the second chrominance component is divided and stored in a remainder of the plurality of banks and the plurality of banks are accessed at a burst mode.

31. The method of claim 30, wherein the controlling of writing the data comprises:
- determining whether an encoding type of each of the macroblocks is a frame unit or a field unit;
- according to the encoding type rearranging the luminance component belonging to the macroblock in units of fields and rearranging the first and second chrominance components in units of frames; and
- allocating addresses so that the rearranged luminance component and the rearranged first and second chrominance components belonging to the macroblock are written in each bank of the memory, and generating an address correspondence table according to an allocation result.

32. The method of claim 30, wherein the controlling of reading the data comprises:
- allocating addresses so that the luminance component and the first and second chrominance components belonging to the macroblock are written in each bank of the memory, and generating an address correspondence table according to an allocation result;
- determining whether an encoding type of each of the macroblocks is a frame unit or a field unit;
- generating addresses to read the luminance component and the first and second chrominance components from the memory by referring to the address correspondence table; and
- according to the encoding type rearranging the luminance component read from the addresses of the memory in units of frames and rearranging the first and second chrominance components in units of fields.

33. The method of claim 30, wherein the memory comprises four banks;
- in each bank data is read and written independently to other banks;
- the luminance component is written in the field structure in the memory; and
- the first and second chrominance components are written in the frame structure in the memory.

34. The method of claim 30, wherein in the controlling of the memory, one of the luminance component and the chrominance component belonging to the same macroblock is rearranged according to an encoding type of each of the macroblocks.

35. A non-transitory computer readable recording medium having embodied thereon a computer for executing a method for writing data in an image processing system, wherein the method comprises:
- providing a memory formed with a plurality of banks capable of being accessed independently; and
- controlling so that a luminance component and a chrominance component, including a first chrominance component and a second chrominance component, belonging to one macroblock are written based on respective structures different to each other, of a frame and a field, in the memory,
- wherein the first chrominance component is divided and stored in some banks of the plurality of banks and the second chrominance component is divided and stored in a remainder of the plurality of banks and the plurality of banks are accessed at a burst mode.

36. The recording medium of claim 35, wherein in the controlling of the memory, one of the luminance component and the chrominance component belonging to the same macroblock is rearranged according to an encoding type of each of the macroblocks.

37. A non-transitory computer readable recording medium having embodied thereon a computer for executing a method for reading data in an image processing system, wherein the method comprises:
- providing a memory formed with a plurality of banks capable of being accessed independently in which a luminance component and a chrominance component, including a first chrominance component and a second chrominance component, belonging to a same macroblock are written based on respective structures different from each other, of a frame and a field, in each bank of the memory; and
- controlling so that the luminance component, the first chrominance component, and the second chrominance component required are read from the memory, wherein the first chrominance component is divided and stored in some banks of the plurality of banks and the second chrominance component is divided and stored in a remainder of the plurality of banks and the plurality of banks are accessed at a burst mode.

38. The recording medium of claim 37, wherein one of the luminance component and the chrominance component belonging to the same macroblock is rearranged according to an encoding type of each of the macroblocks, prior to being written in the memory.

39. A non-transitory computer readable recording medium having embodied thereon a computer for executing a method for writing and reading data in an image processing system, wherein the method comprises:

providing a memory formed with a plurality of banks capable of being accessed independently in which a luminance component and a chrominance component, including a first chrominance component and a second chrominance component, belonging to one macroblock are written based on respective structures different to each other, of a frame and a field, in each bank of the memory;

controlling so that the luminance component, the first chrominance component and the second chrominance component belonging to the macroblock are written based on respective structures different to each other, in the memory; and controlling so that the luminance component, the first chrominance component, and the second chrominance component required are read from the memory, wherein the first chrominance component is divided and stored in some banks of the plurality of banks and the second chrominance component is divided and stored in a remainder of the plurality of banks and the plurality of banks are accessed at a burst mode.

40. The recording medium of claim 39, wherein in the controlling of the memory, one of the luminance component and the chrominance component belonging to the same macroblock is rearranged according to an encoding type of each of the macroblocks.

* * * * *

UNITED STATES PATENT AND TRADEMARK OFFICE
CERTIFICATE OF CORRECTION

PATENT NO.        : 8,175,157 B2
APPLICATION NO.   : 11/354174
DATED             : May 8, 2012
INVENTOR(S)       : Sangjo Lee et al.

It is certified that error appears in the above-identified patent and that said Letters Patent is hereby corrected as shown below:

Column 16, Line 65, In Claim 17, delete "a ccording" and insert -- according --, therefor.

Column 17, Line 30, In Claim 18, delete "rearranqe" and insert -- rearrange --, therefor.

Column 17, Line 65, In Claim 23, delete "a ccording" and insert -- according --, therefor.

Signed and Sealed this
Thirty-first Day of July, 2012

David J. Kappos
*Director of the United States Patent and Trademark Office*